Jan. 6, 1931.  A. COLTON  1,787,777
CAPSULE MACHINE
Filed Dec. 10, 1926   25 Sheets-Sheet 1

INVENTOR.
Arthur Colton
BY Francis D. Hardesty
ATTORNEY.

Jan. 6, 1931.  A. COLTON  1,787,777
CAPSULE MACHINE
Filed Dec. 10, 1926  25 Sheets-Sheet 2

INVENTOR.
Arthur Colton
BY
Francis D. Hardesty
ATTORNEY.

Jan. 6, 1931.                A. COLTON                 1,787,777
                           CAPSULE MACHINE
                         Filed Dec. 10, 1926      25 Sheets-Sheet 4

INVENTOR.
Arthur Colton
BY
Francis D. Hardesty
ATTORNEY.

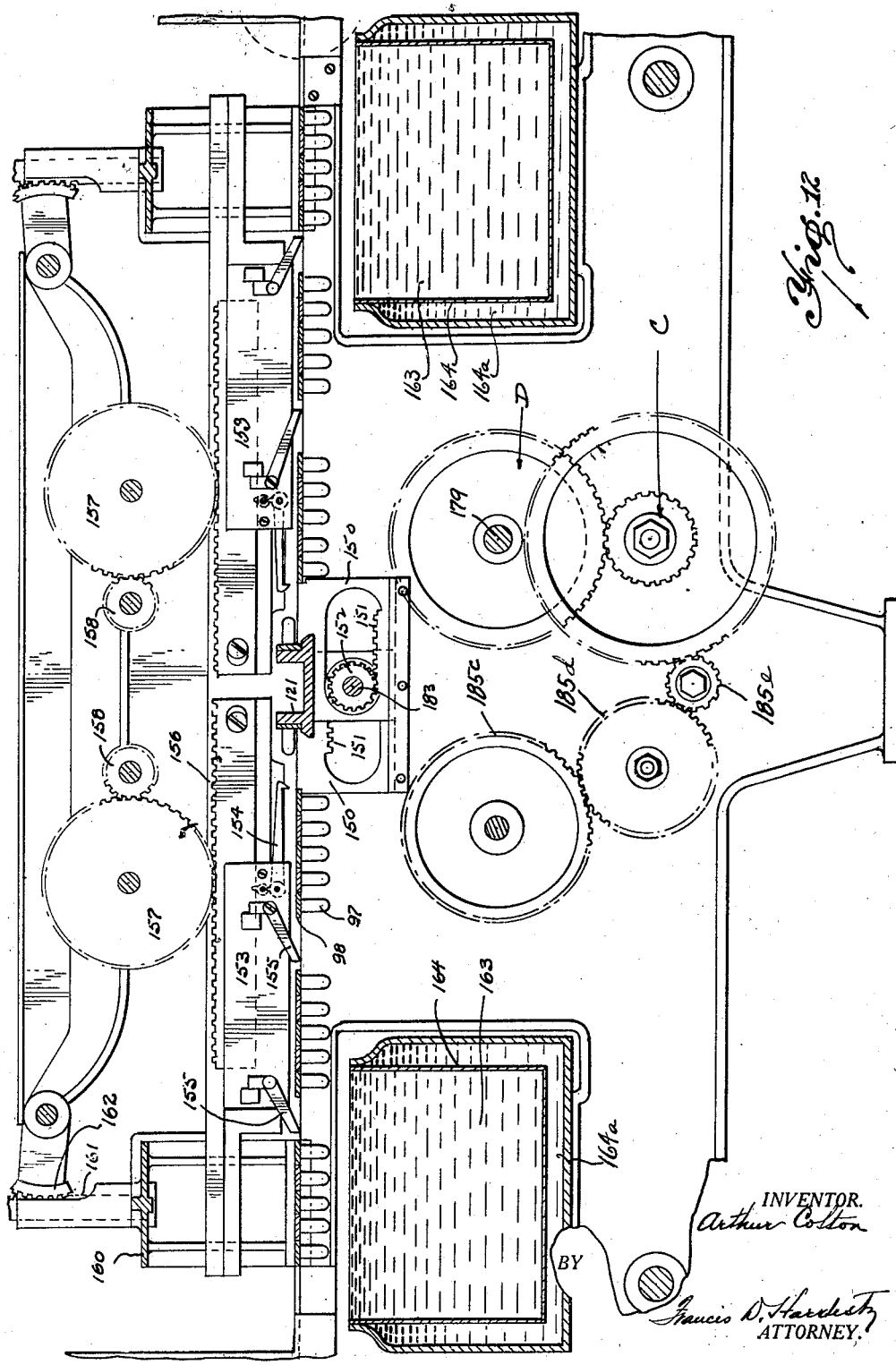

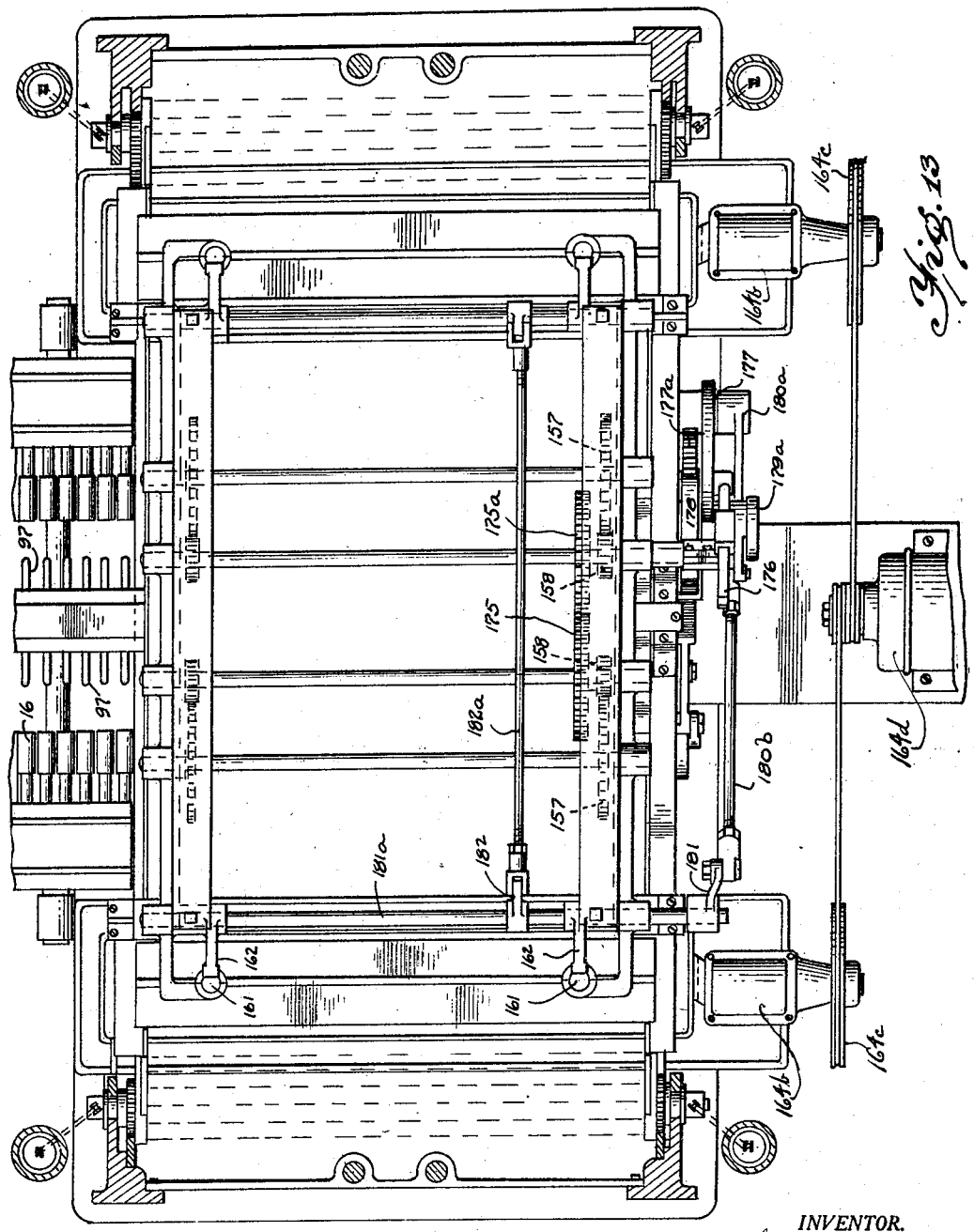

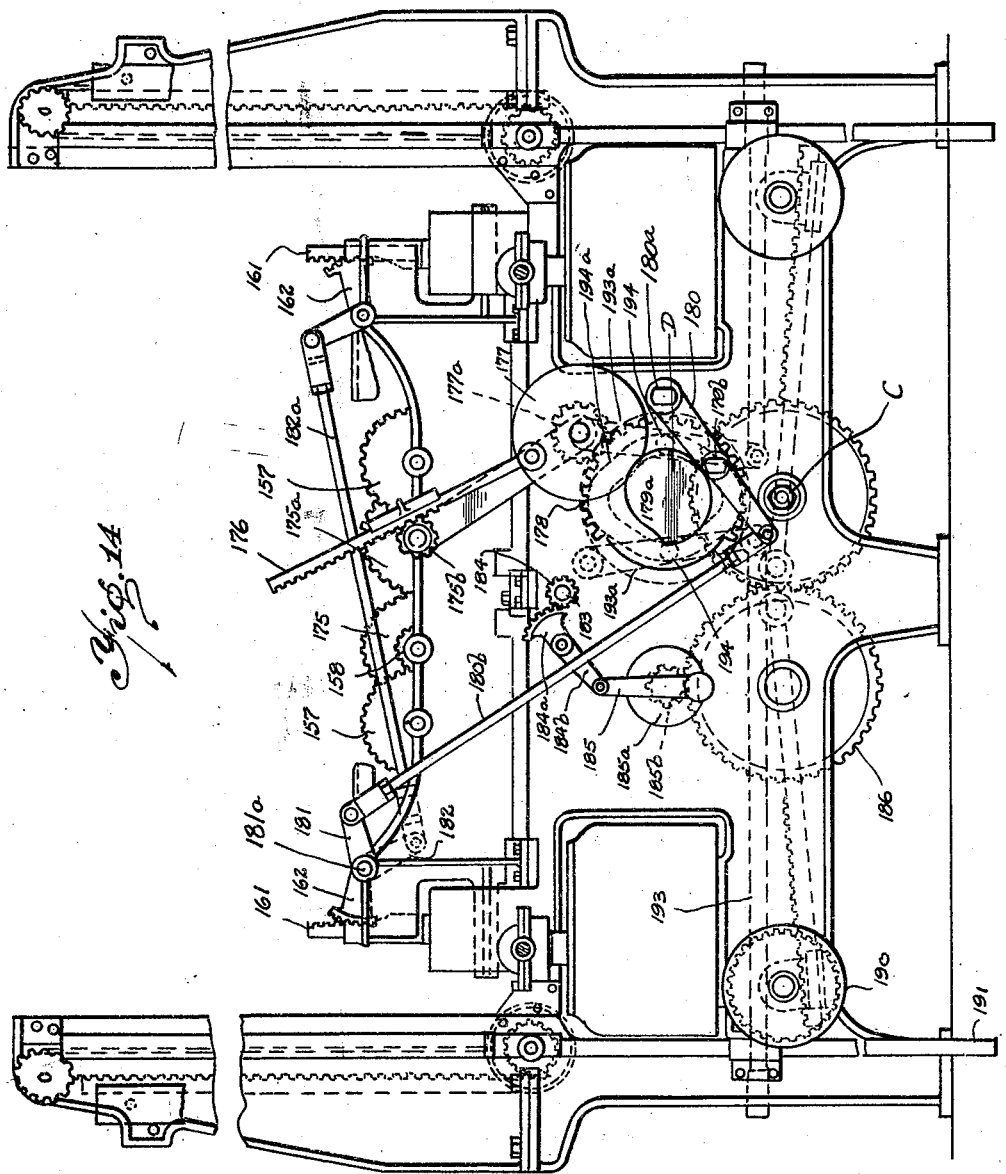

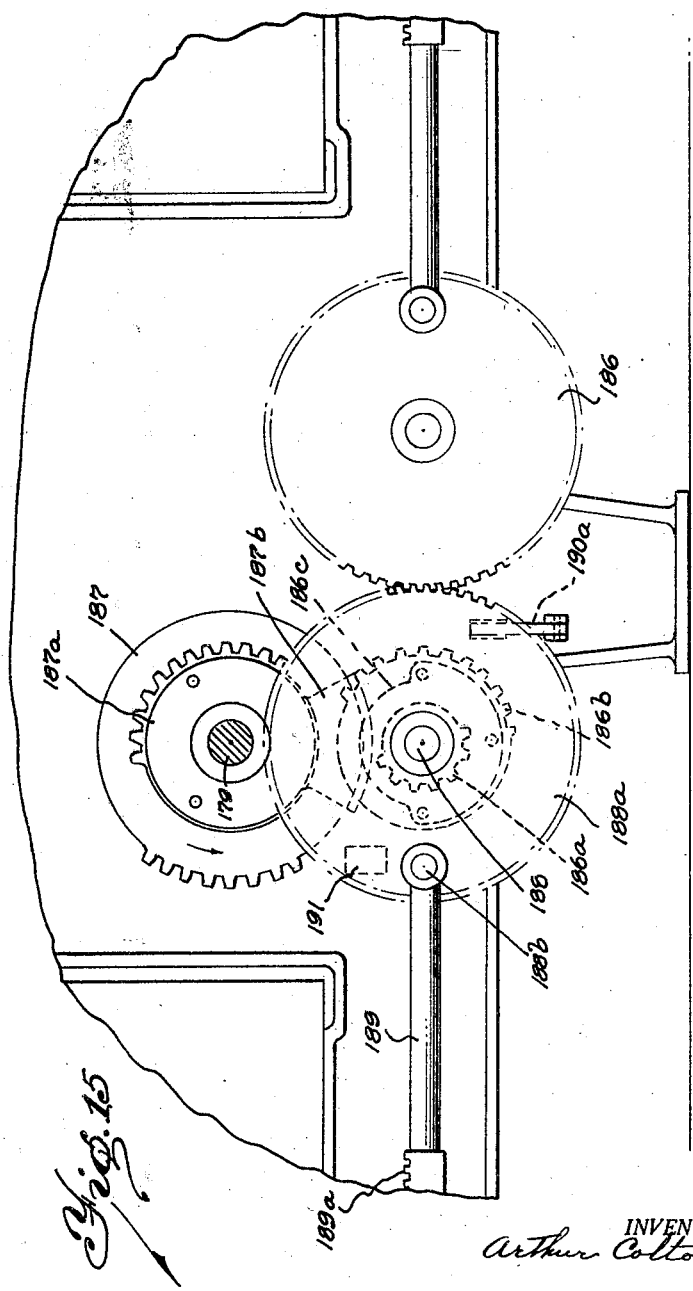

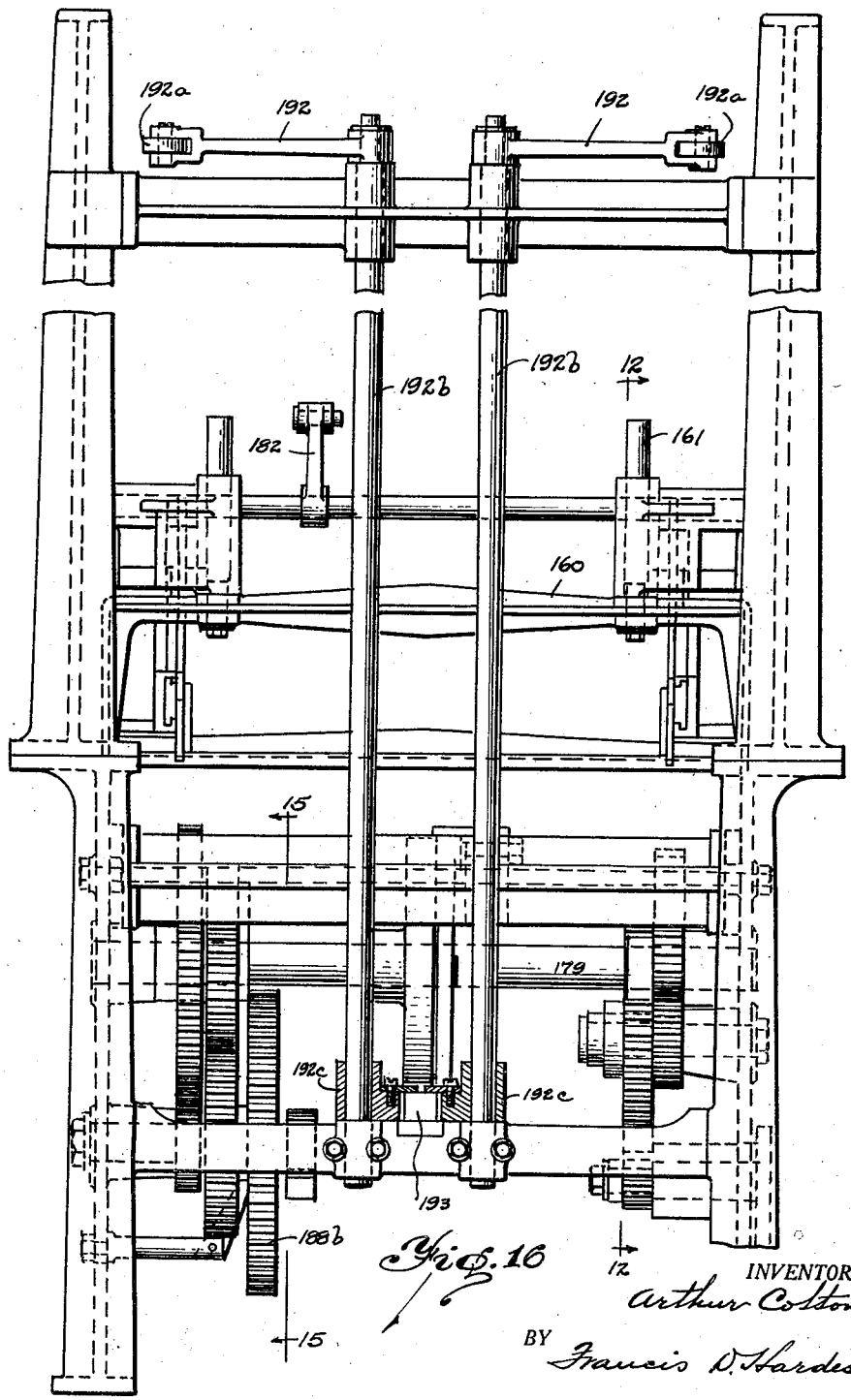

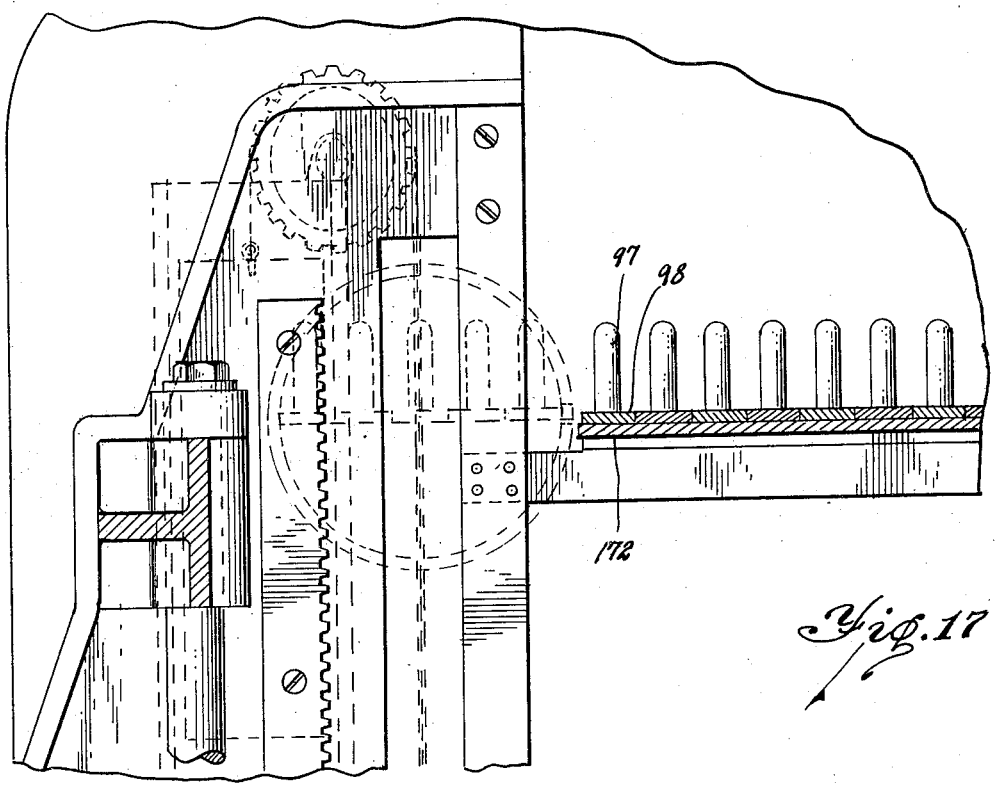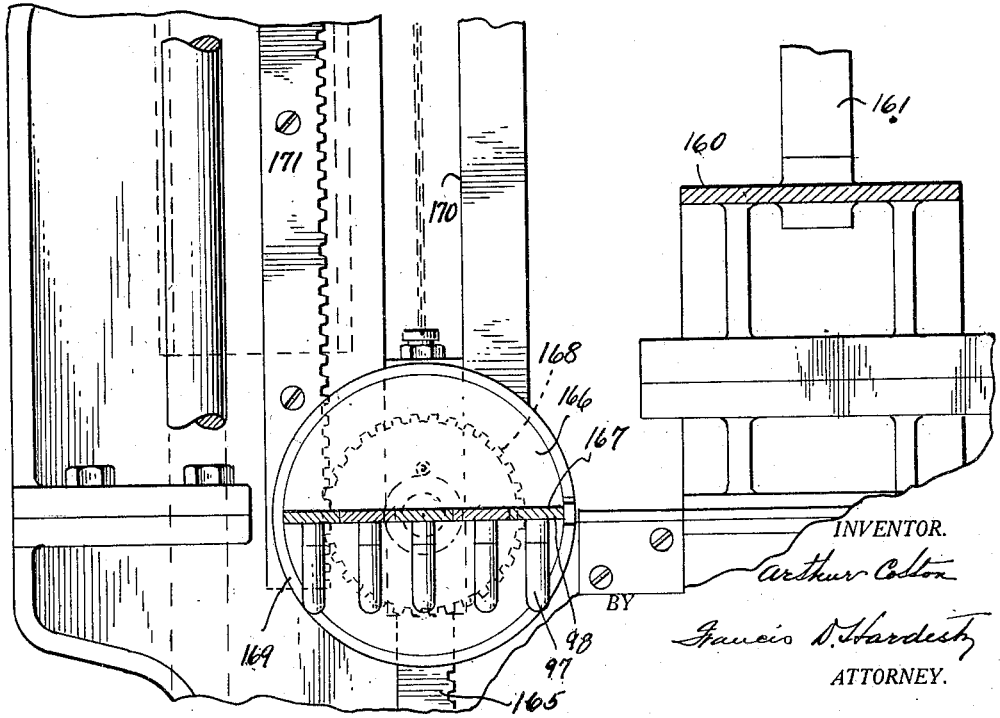

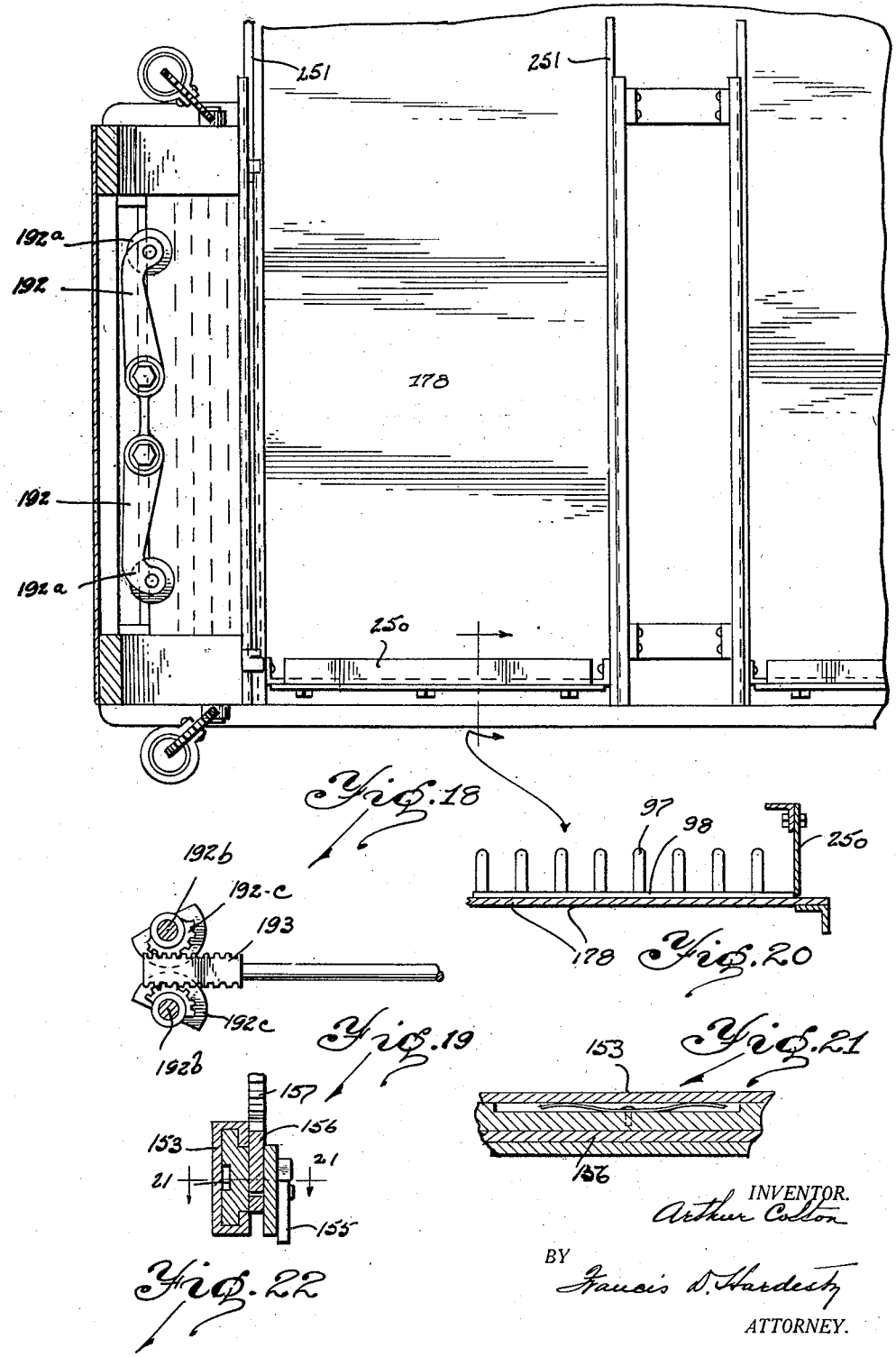

Jan. 6, 1931. A. COLTON 1,787,777
CAPSULE MACHINE
Filed Dec. 10, 1926 25 Sheets-Sheet 14

Jan. 6, 1931.  A. COLTON  1,787,777
CAPSULE MACHINE
Filed Dec. 10, 1926  25 Sheets-Sheet 16

INVENTOR.
Arthur Colton
Francis W Hardesty
ATTORNEY.

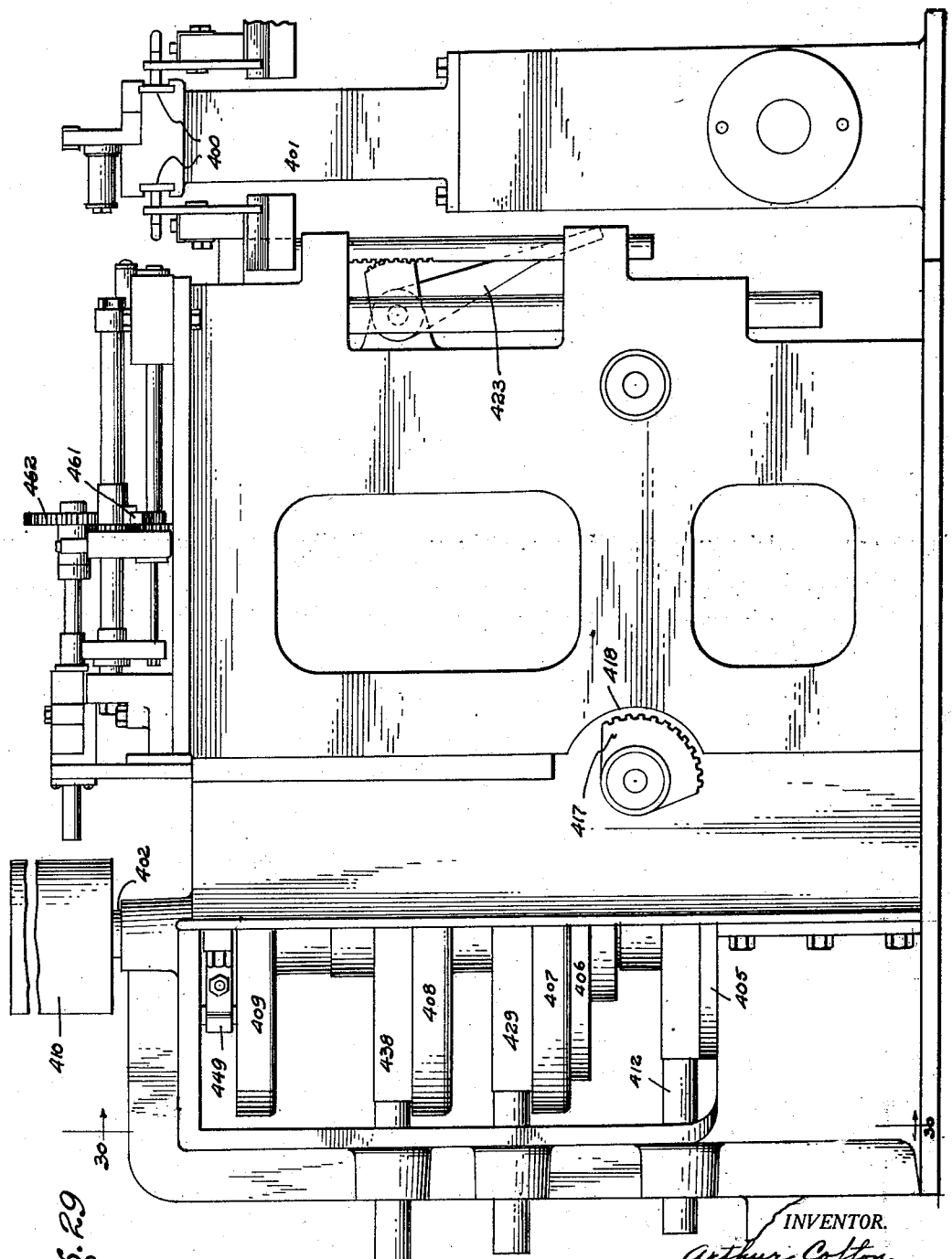

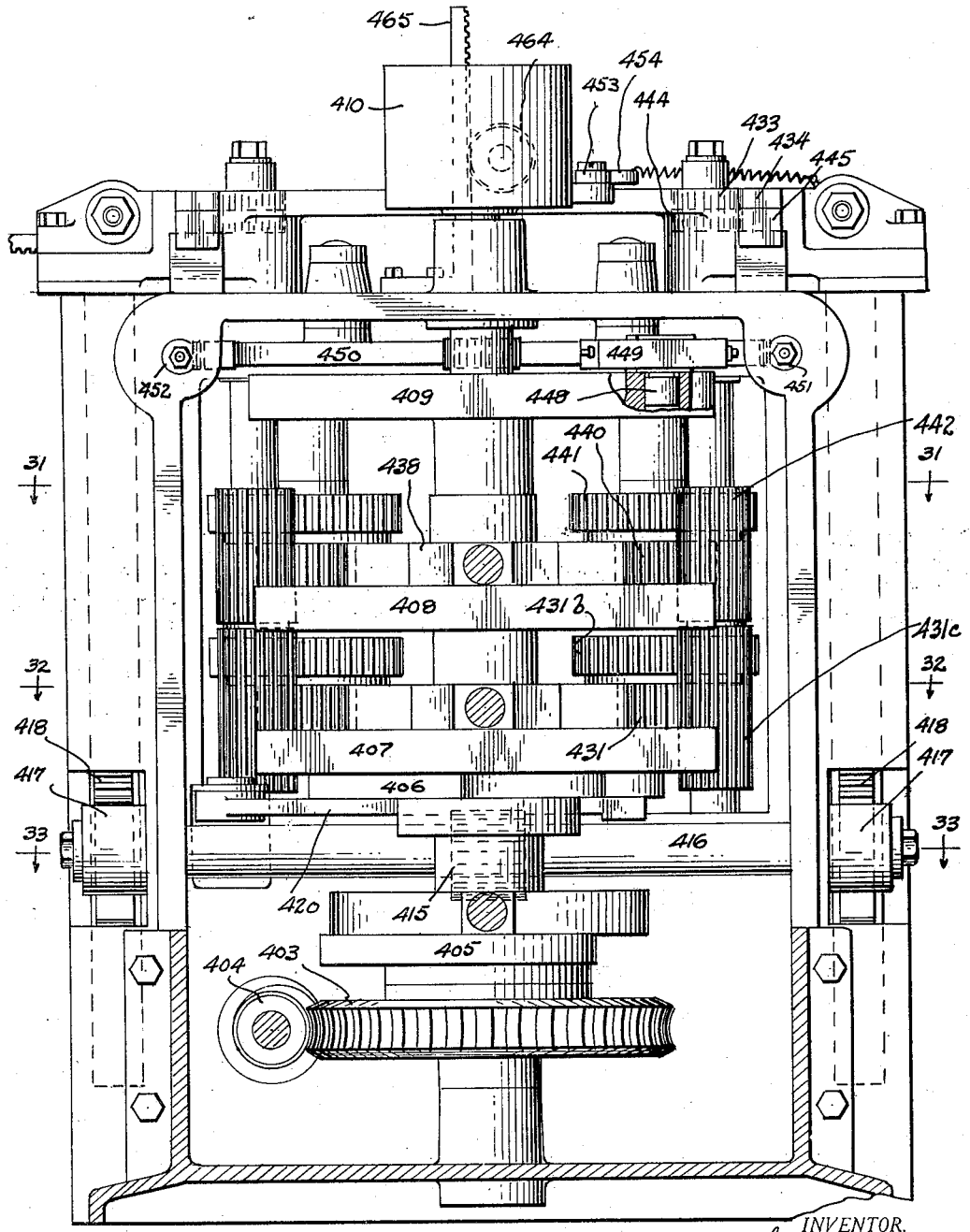

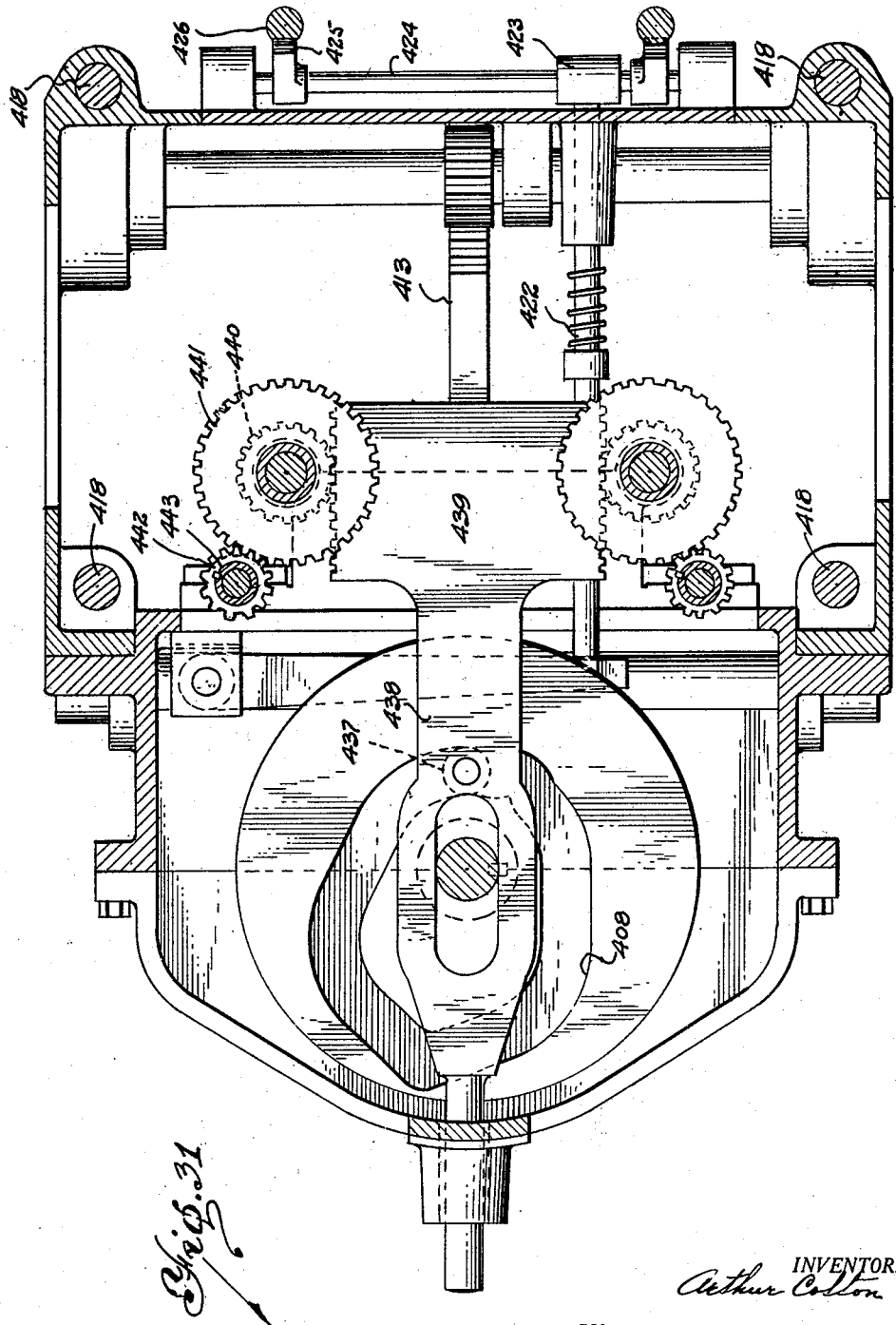

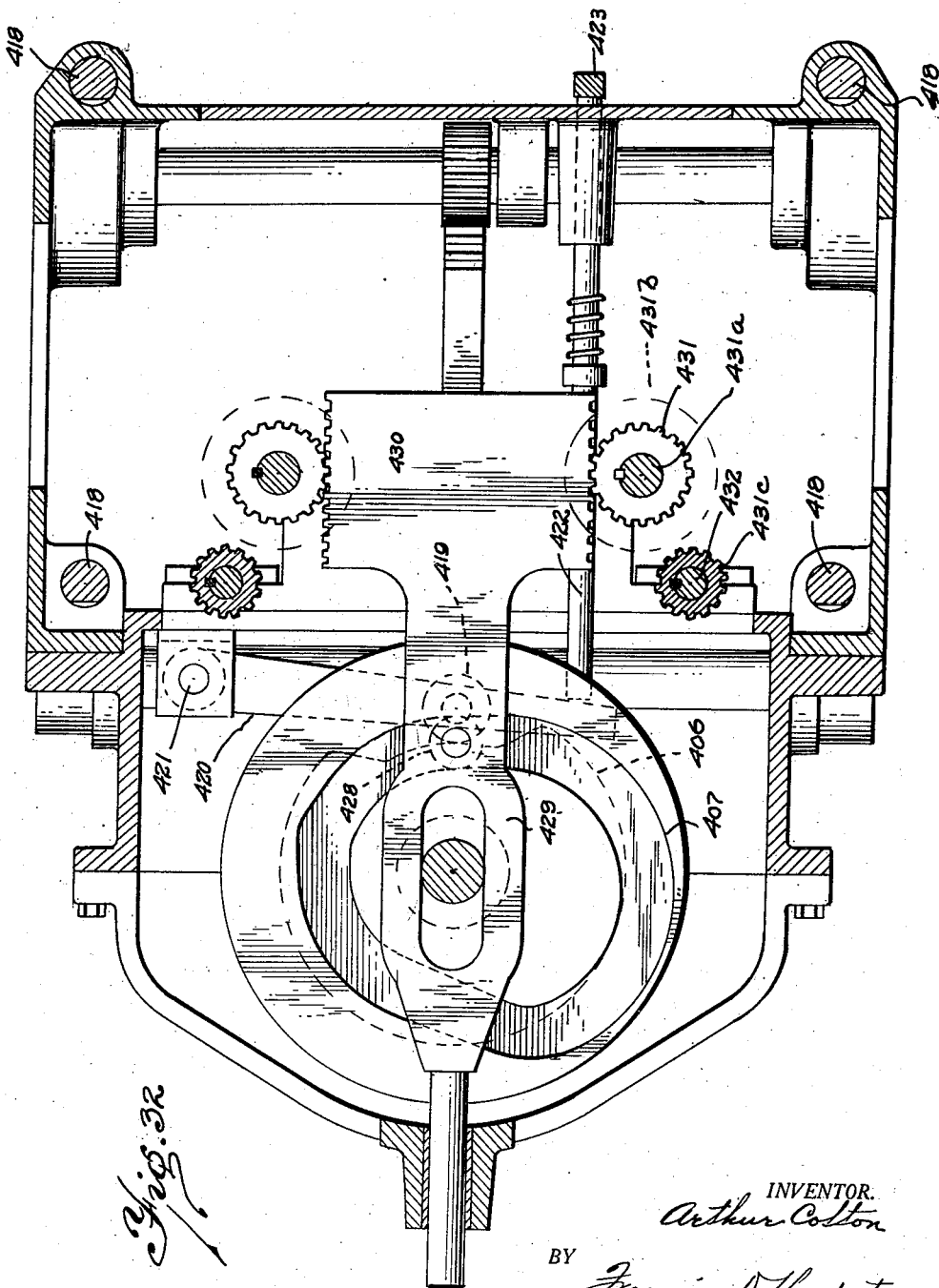

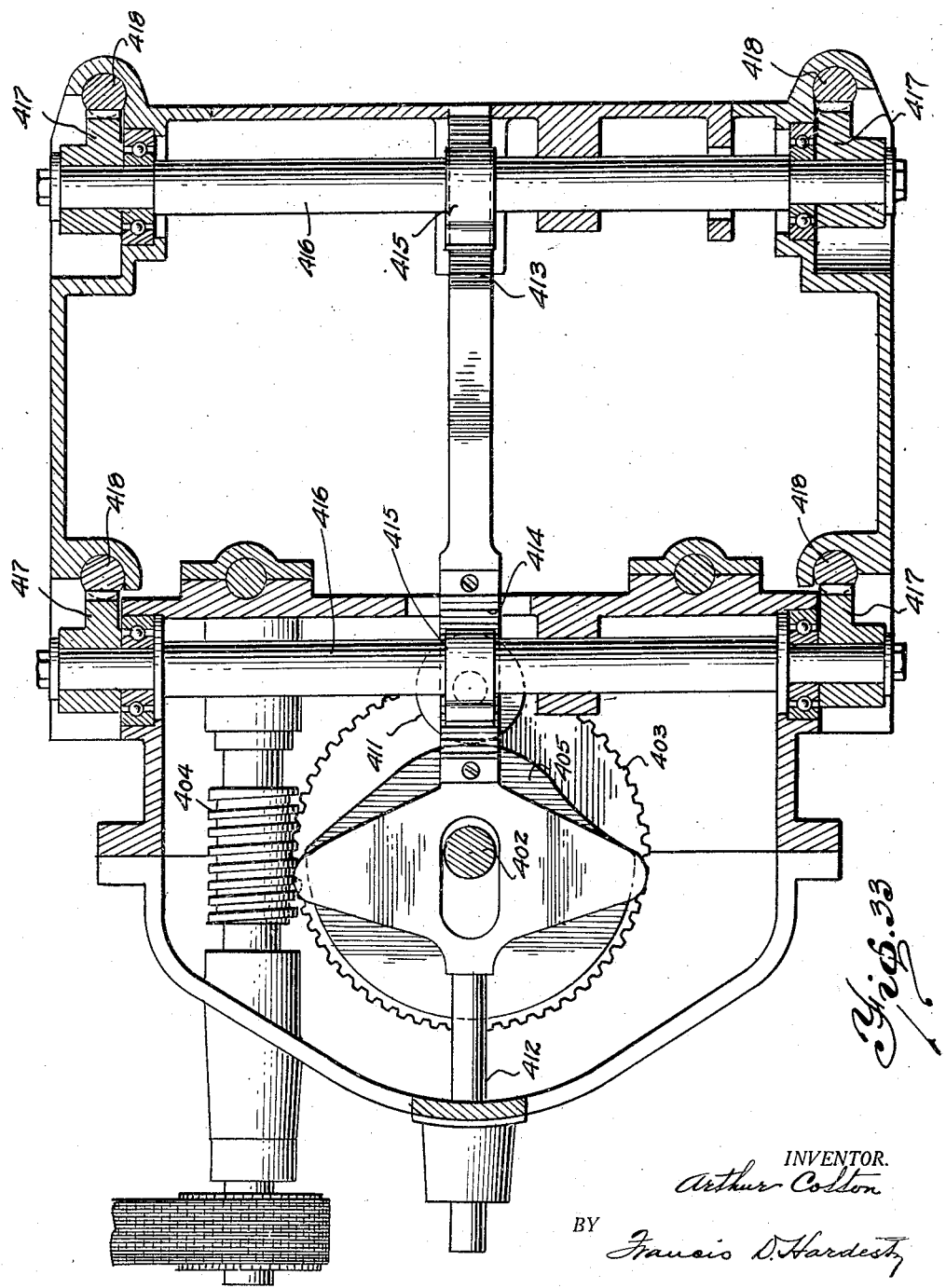

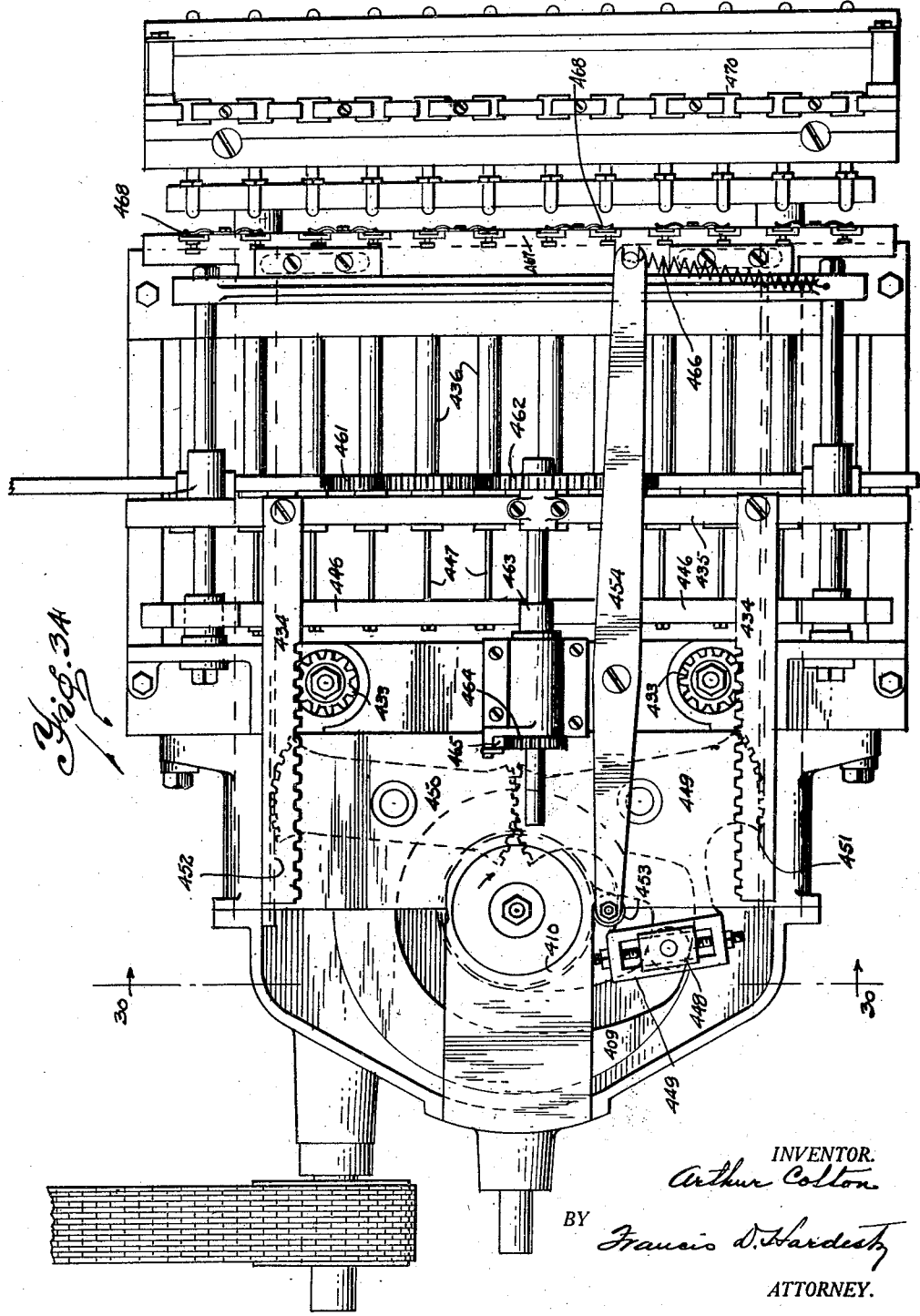

Jan. 6, 1931.  A. COLTON  1,787,777
CAPSULE MACHINE
Filed Dec. 10, 1926   25 Sheets-Sheet 25
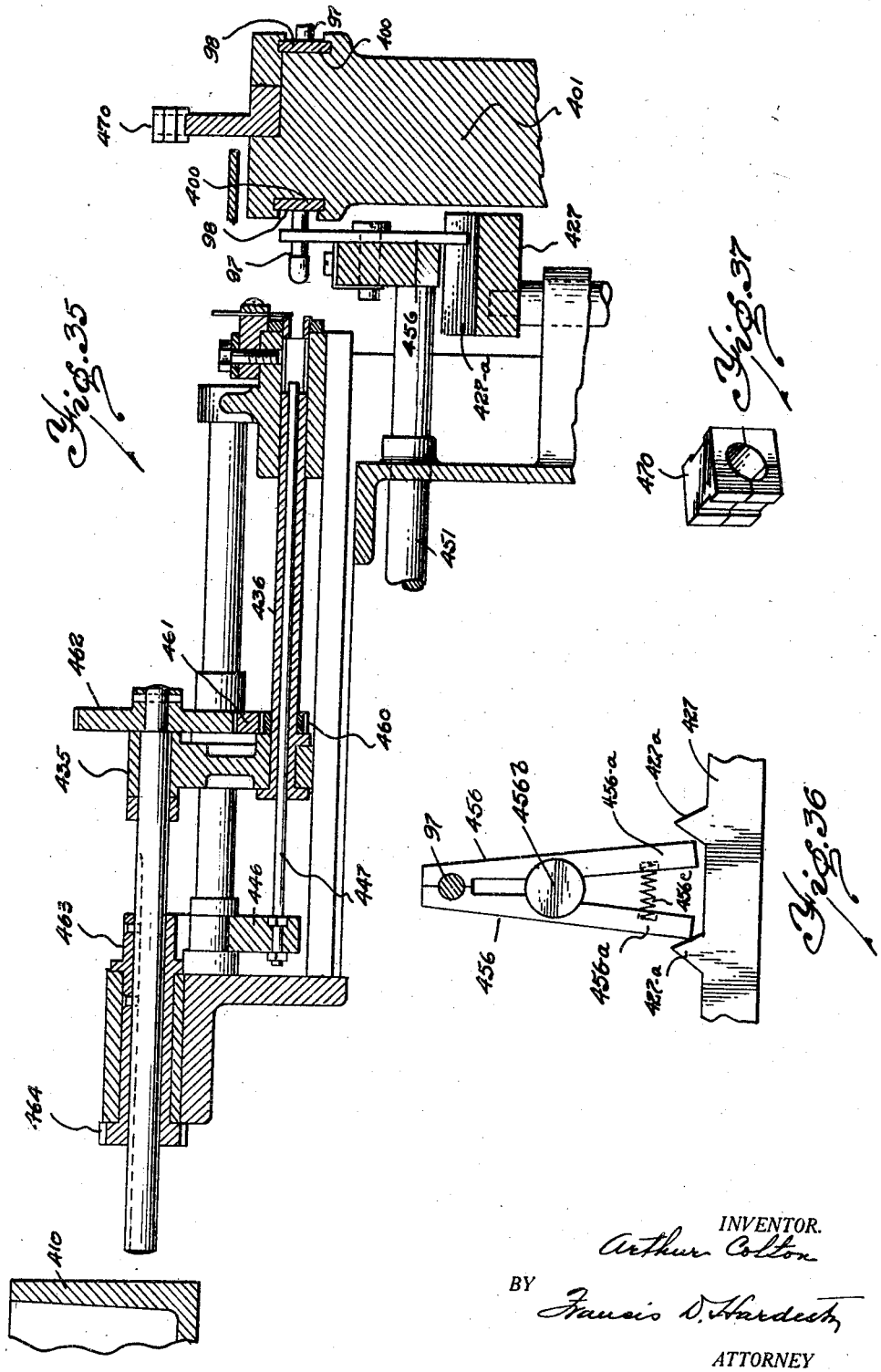
INVENTOR.
Arthur Colton
BY
Francis D. Hardesty
ATTORNEY Patented Jan. 6, 1931

1,787,777

UNITED STATES PATENT OFFICE

ARTHUR COLTON, OF DETROIT, MICHIGAN, ASSIGNOR, BY MESNE ASSIGNMENTS, TO PARKE, DAVIS & CO., OF DETROIT, MICHIGAN, A CORPORATION OF MICHIGAN

CAPSULE MACHINE

Application filed December 10, 1926. Serial No. 153,806.

The present invention relates to machines for making capsules.

Among the objects of the invention is a machine for the purpose that is automatic in its operation to form the capsule parts from a suitable gelatin solution, and deliver the finished capsule.

Another object is a machine that will form the capsule bodies and caps and deliver the finished capsules with the caps upon the bodies.

Another object is a machine that will form capsule bodies and caps in independent but parallel and isochronous operations so that the two parts may be, if desired, formed from different solutions and a completed capsule of two colors, for example, delivered.

Still another object is a machine that forms the capsule parts on suitable molding elements, strips the parts therefrom, trims, and places the caps upon the bodies.

Other objects will readily appear to those skilled in the art upon reference to the following description and accompanying drawings in which:—

Figs. 1a and 1b together show a diagrammatic side elevation of a complete machine;

Figs. 2 to 8 inclusive are diagrammatic views showing the several operations of the machine;

Fig. 12 is a sectional view of the dipping unit on line 12—12 of Fig. 16;

Fig. 13 is a plan view of this unit;

Fig. 14 is a front end view of the same;

Fig. 15 is a sectional view of the same on line 15—15 of Fig. 16;

Fig. 16 is a side view of the same unit;

Fig. 17 is an enlarged sectional view of the second elevator;

Fig. 18 is a view looking down on the same and on one end of one of the drier floors;

Figs. 19 to 22 are detail sectional views of parts shown in the previous figures;

Fig. 29 is an end elevation of one half of the automatic unit;

Fig. 30 is a section of the same on line 30—30 of Fig. 29;

Fig. 31 is a horizontal section on line 31—31 of Fig. 30;

Fig. 32 is a horizontal section on line 32—32 of Fig. 30;

Fig. 33 is a horizontal section on line 33—33 of Fig. 30;

Fig. 34 is a plan view of the same unit;

Fig. 35 is an enlarged section of a portion of the same;

Fig. 36 is an enlarged end view of one of the strippers;

Fig. 37 is an enlarged perspective view of one of the capping guides.

The operation of the machine consists in the carrying out of a number of steps which consist of the following in the order indicated, illustrated diagrammatically by Figs. 2 to 8.

Figure 4:
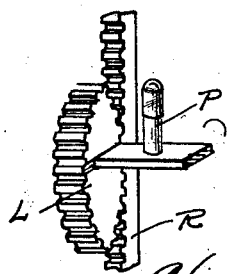
Figure 5:
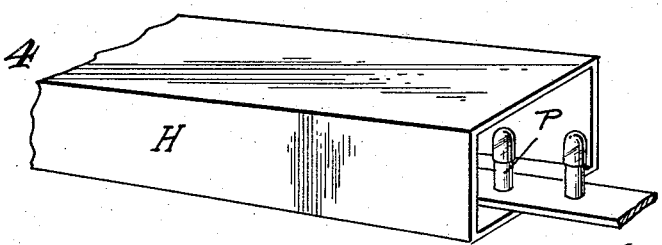
Figure 7:
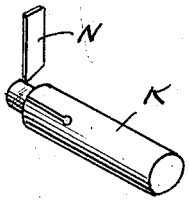
Figure 8:
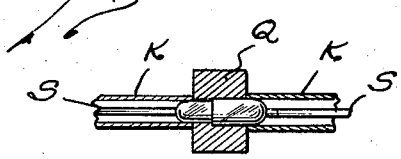
Figure 9:
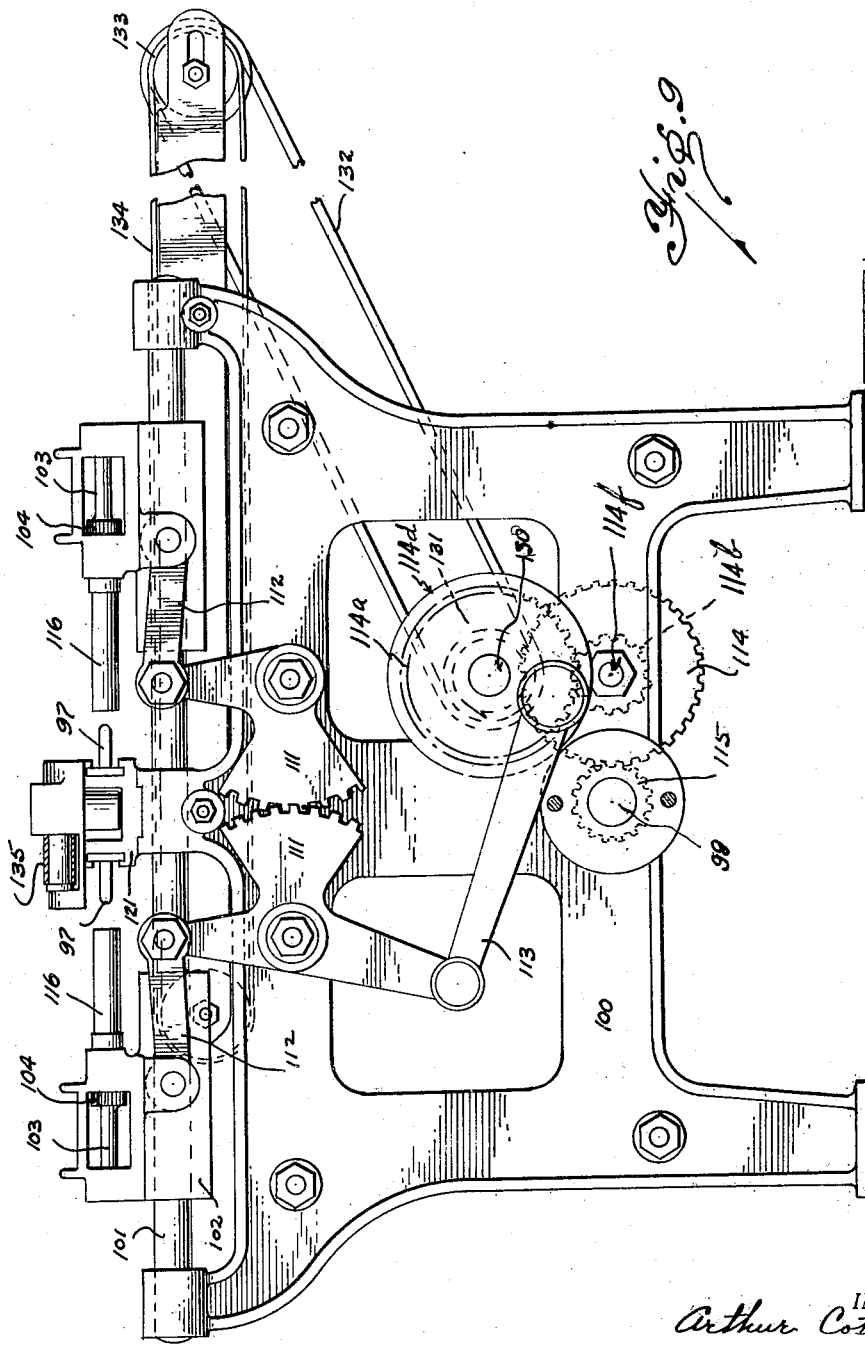
Fig. 9 is an end elevation of the greasing unit from the right of Fig. 10.
Figure 10:
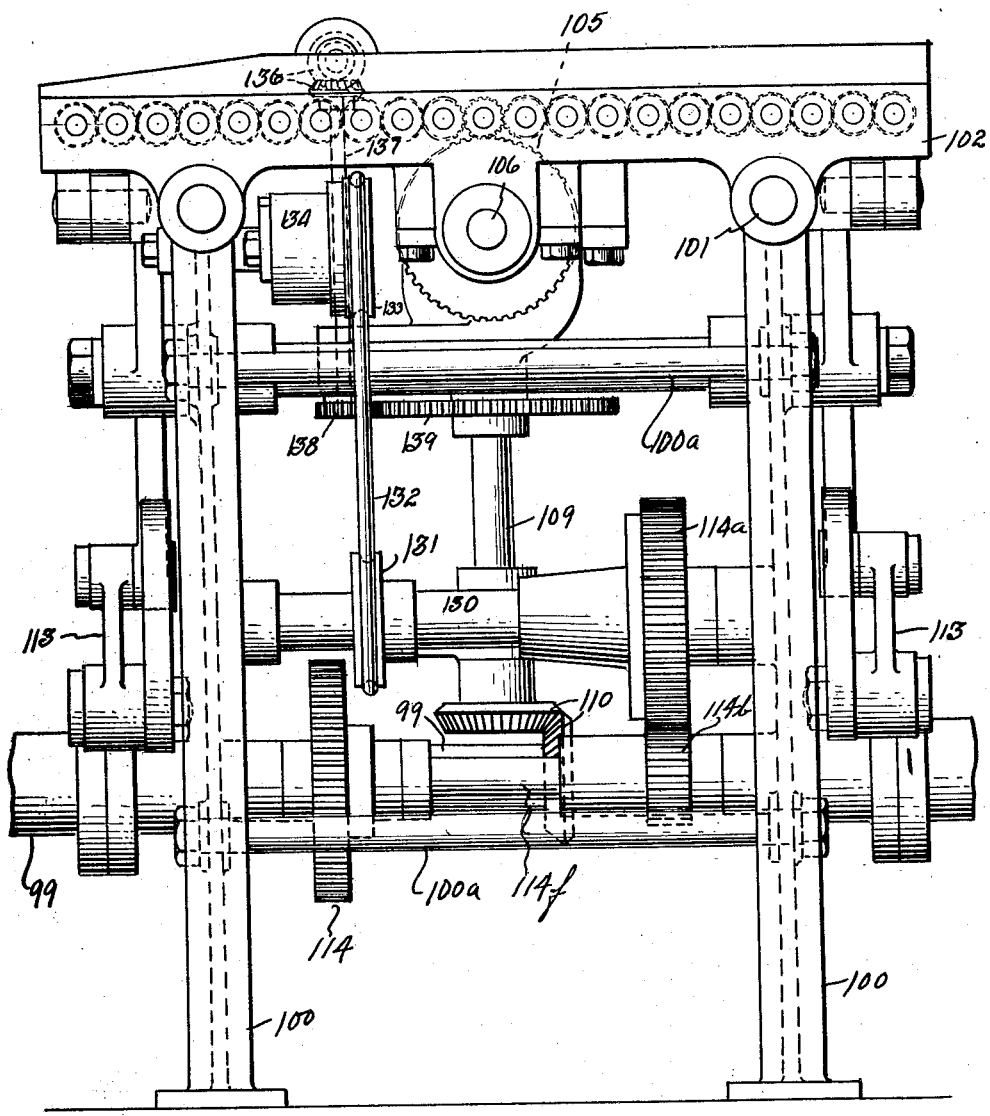
Fig. 10 is a side elevation of the same from the left of Fig. 9.

The pins upon which the capsules are formed are first greased (Fig. 2) in that part of the machine which constitutes the greasing unit A and are then passed on into the dipping unit B. In this dipping unit (Fig. 3) the individual bars each carrying about twenty pins are collected in groups and moved laterally with the pins hanging downward. After being grouped and moved out of the path of the bars coming from the greasing unit the group is lowered so that the pins dip into a solution of gelatin of the proper consistency and temperature which is somewhat higher than that of the pins, and remain in this solution for a short time, so that a certain amount of the gelatin solution will collect on each pin. The group of bars is then lifted from the solution and moved laterally into an elevating device (Fig. 4) which lifts them to a higher level and in the lifting whirls the bars through the atmosphere so as to preliminarily dry the coating and thus prevent running of the gelatin. At this upper level they are moved laterally upon the bed of drier unit C and remain until other groups have been added, whereupon the several groups are moved the length of the bars into the drier (Fig. 5). At the far end of the drier the bars are lowered from the upper level to a lower level and pass back through the drier to reach eventually mechanism (unit D) which breaks up the collections of bars and feeds single bars to the next unit E. This mechanism (unit D) turns the bars on their sides with the pins pointing outward and pushes them into position where they can be acted on by the next unit mentioned (unit E) which is the automatic stripping, cutting and capping unit. In this unit the dried capsule is stripped from the pin (Fig. 6) into a holder K which is then revolved rapidly (Fig. 7) against a knife which cuts off the excess gelatin while the holder and knife move into alignment with joiner Q. The holder K then moves inwardly and meets a second holder containing the other part of the capsule formed in the same fashion and places the cap upon the other portion (Fig. 8). During this capping the two parts are ejected from the holders and at the end of the capping movement the complete capsule is dropped upon a conveyor which carries it to a suitable receptacle. After the capsule parts have been stripped from the pins on the bars the latter are moved out of the stripping unit to the greasing unit and still lying on their sides are passed in front of a plurality of rotating greasing cups which grease each pin preparatory to starting the operation anew.

Figure 2:
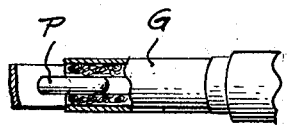
Figure 3:
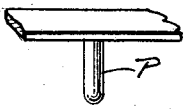
Figure 6:
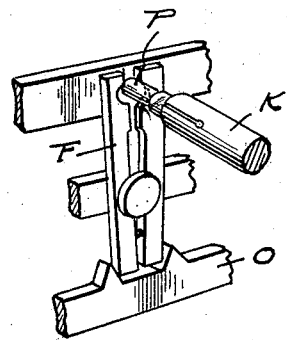

Fig. 2 shows a pin P within a greasing cup G. In the next figure, Fig. 3, a pin P is illustrated as about to be dipped in a bath of gelatin M. Fig. 4 illustrates the operation of the elevator which whirls the pins P to preliminarily dry the gelatin. In this figure is shown a stationary rack R upon which rolls the gear L in its upward movement. Fig. 5 illustrates the drying step, the pins P passing through the chamber H through which air is circulated. The stripper is illustrated in Fig. 6, the pin P being embraced by the fingers F which are moved lengthwise of the pin to strip the capsule from the pins and push it into holder K. After stripping, the fingers F are moved apart by the cam bar O which rises from below. Fig. 7 shows a knife N in operating position. Fig. 8 shows the capping operation, the two parts of the capsule being guided in capping by the block Q and being ejected from the holders K by the ejectors S.

As indicated above, the complete machine consists of two parts substantially alike and operating in conjunction with each other. One of these parts produces the capsule body and the other the caps and the two parts are then joined and the complete capsule delivered from the machine.

It will be understood that the two parts of the machine are placed side by side so that their operation is simultaneous. Only one of these will be described in detail except for parts not common to both.

The greasing unit A (Sheets 3, 4 and 5). This unit consists of a pair of frame members 100 connected by suitable cross members 100a and having at their upper ends guide rods 101 upon which slide blocks 102. Each of the blocks 102 carries as many spindles 103 as there are pins on a pin bar. These spindles 103 each include a gear 104 which gears mesh together and the whole line is driven by a large gear 105 also carried by block 102. Gears 105 are splined upon the shaft 106 driven through bevel gear 107 by the bevel 108 on upright shaft 109 in turn driven through bevel gears 110 by the main drive shaft 99.

Blocks 102 carrying the spindles 103 are moved toward and away from each other by the intermeshing segments 111 which are connected to the blocks through links 112. There is a pair of segments 111 at each end of the unit and one of each pair is connected through a link 113 to a crank pin on a disc 114d mounted on a shaft 130. Shaft 130 carries a gear 114a which meshes with a gear 114B on a shaft 114F which shaft carries a gear 114 meshing with a gear 115 carried on the power shaft 99.

Figure 11:
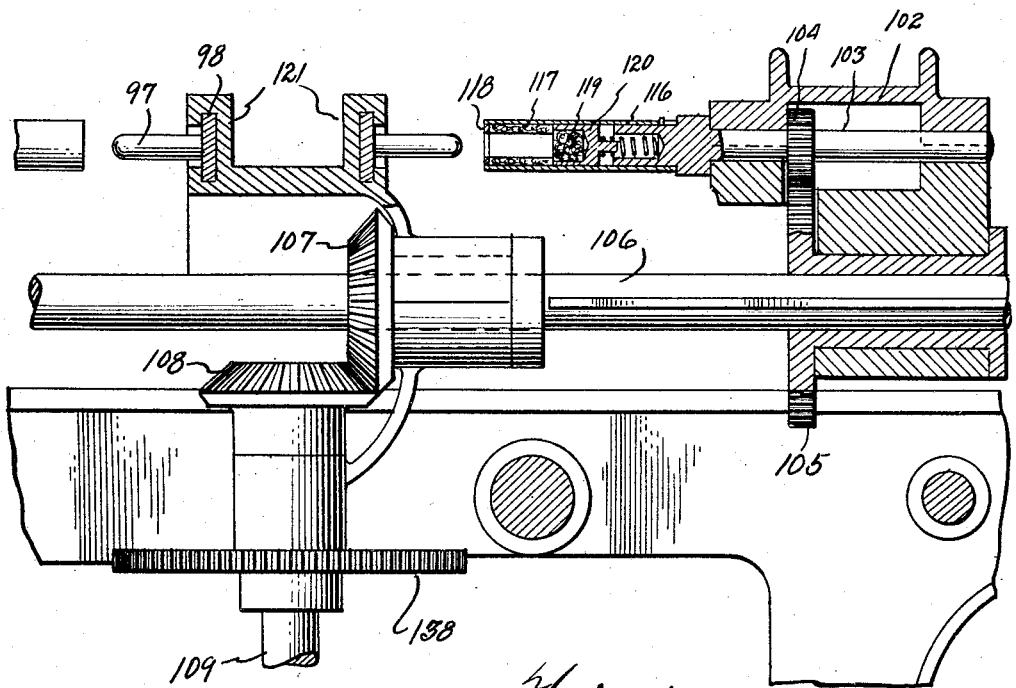
Fig. 11 is an enlarged sectional view of a part of the greasing unit.
Figure 23:
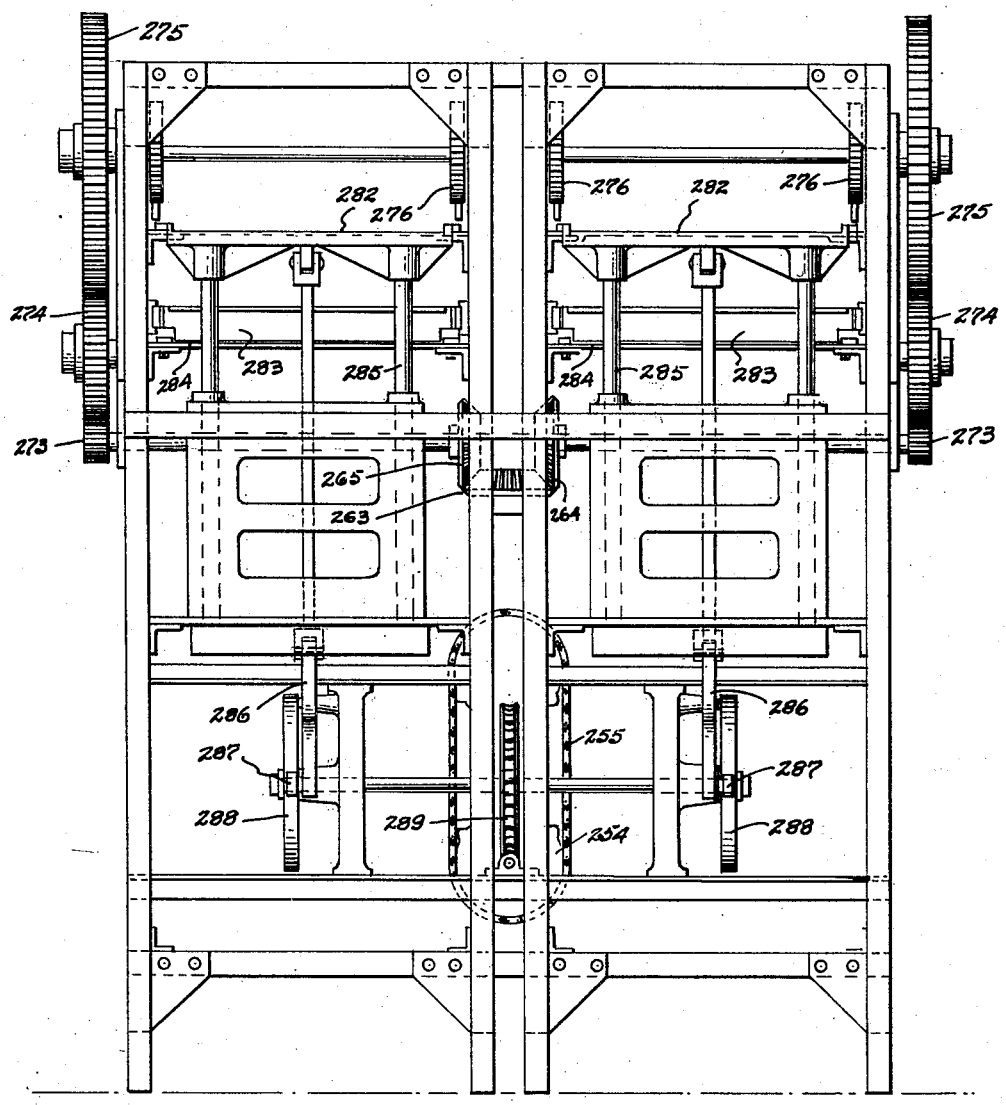
Fig. 23 is an elevation of the rear end of the drier.

The spindles 103 as shown in Fig. 11 each carry a cup 116 at the projecting inner end and within the cup is a lining of felt 117 held therein by the ring 118. At the bottom of the cup is a felt plug 119 carried in a spring pressed plunger 120. These felts are to be saturated with a suitable oil for greasing the capsule molding pins.

Midway of the unit is a double slide 121 into which the bars 98 carrying the pins 97 are slid from the preceding unit and which slide holds the bars in position with the pins pointing outward. These bars are moved into position during the time when the spindle blocks 102 are in their outward position and the blocks 102 then moved by segments 111 to move a cup 116 over each pin while the cup is being rapidly rotated.

It will be noted that the gear 114a is carried upon a shaft 130 and this shaft also carries a small pulley 131 which through belt 132 drives a second pulley 133 for a conveyor 134. This conveyor carries the finished capsules out to the side of the machine where they are deposited in a suitable receptacle.

The finished capsules are fed onto this conveyor from a second conveyor shown at 135 as operating longitudinally of the machine and this conveyor carries the capsules from the cutting and stripping unit, which unit carries out the last operation. The conveyor 135 is driven through bevel gears 136 from an upright shaft 137 and the latter is driven through a spur gear 138 meshing with a larger gear 139 fixed on the upright shaft 109.

Dipping unit

The double guide 121 in the greasing unit is continued forward in the machine into the dipping unit but in the latter has the upper guide groove removed so that when the bar has entirely left the greasing unit its upper side is released and it falls with the pins down upon suitable end supports. As each bar falls from the guide 121, it is moved laterally by a slide 150. At each end of the guide 121 in this unit are a pair of these slides and these are operated by racks 151 and gears 152 to push both ways from the guide 121 the two bars which drop on either side. When a group of five bars has collected, the group is moved laterally through the operation of a carrier block 153. This carrier block has projecting from its one end a hook 154 and at two other points it carries pawls 155. The hook 154 is spaced from the first pawl 155 such a distance that when the carrier has moved outwardly a sufficient distance to move a group out of the way of a new group and has returned to its first position, the pawl is then positioned to carry this group into the dipping elevator when the carrier makes its second movement. This carrier block operates in suitable slides and has along its upper edge a rack 156 meshing with a gear 157, which in turn meshes with a smaller gear 158.

Gear 158 is secured to a larger gear 175 which in turn meshes with gear 175a carrying a second 158, the latter two gears being carried on a shaft extending outwardly and carrying a gear 175b which is actuated by a rack 176 formed on pitman reciprocated by a disc 177 secured to gear 177a meshing with mutilated gear 178, the latter being carried on a shaft 179 which is the drive shaft for the mechanism on the front end of this unit.

The extreme end of shaft 179 carries a cam 179a whose follower 179b is carried on an arm 180 pivoted at 180a and connected to link 180b at its free end. Link 180b through arm 181 oscillates shaft 181a to which are secured segments 162 actuating racks 161 carrying the dipping elevators 160. Connected to shaft 181a is a depending arm 182 which through link 182a operates the corresponding segments 162 and racks 161 on the other dipping elevator 160.

In Fig. 14 is also shown the drive for the pinions 152 actuating racks 150 which cause the bars to be moved outward from guide 121 to the dipping elevator. Pinions 152 are carried on a shaft 183 beneath guide 121 and an extension of this shaft carries a pinion 184 meshing with a segment 184a reciprocated by its lever arm 184b connected through pitman 185 to a disk 185a rotated by gear 185b meshing with a larger gear 185c which in turn meshes with idler 185d driven by pinion 185e.

When the group of bars has been moved outwardly to its second position mentioned, it is then in an elevating cage 160, which lowers the pins into a gelatin solution through the operation of rack 161 and segment 162. The gelatin solution is indicated at 163 as being contained in a jacketed vessel 164 which is preferably maintained at a constant temperature as hereinafter described.

The elevator 160 lowers the pins so as to dip them into the gelatin solution and after a short period lifts them out of the solution. When they have been returned to their original level the pawl 155 moves them outwardly into a second elevator which lifts them to the level of the upper end of the drier and at the same whirls the group of bars in the air so as to give the gelatin an initial set and to assist in proper distribution. This second elevator is shown more clearly in Fig. 17, sheet 11. This elevator consists of a pair of racks 165 carrying at their upper ends discs 166 each having a diametrically located groove 167 in one face. The disc is provided on the side opposite the groove with a gear 168 and with a suitable bearing in the upper end of rack member 165. The disc 166 rotates in a flanged ring 169 which prevents the bars from falling out of the groove as the disc is rotated. The upper end of rack 165 slides vertically in a guide slot 170 and alongside of the latter is a rack 171 with which the gear 168 meshes. As the rack 165 is elevated it, of course, carries up with it the disc 166 and the bars previously placed in the groove 167 and on account of the action of the rack 171 and gear 168 the group of bars is turned over and over until its upper limit of travel has been reached. These elements are so proportioned that when the elevator has reached its upper limit of travel the bars will be turned with the pins up and in position to be moved laterally out of the groove 167 onto a platform 172.

The operating means for the elevators is shown best in Figs. 14 and 15.

Secured to shaft 179 is a mutilated gear 187 to which is secured a second mutilated gear 187a with a locking segment 187b between. These gears are adapted to mesh with corresponding mutilated gears 186a and 186b and the segment to co-operate with notched plate 186c on shaft 188. Shaft 188 carries a gear 188a having a pitman pin 188b for pitman 189, which latter carries a rack 189a actuating a shaft to which are secured gears 190 which in turn mesh with racks 165 operating the elevators.

Shaft 179 is in constant rotation and the gears 187 and 187a are so located that they mesh with and actuate gears 186a and 186b alternately with a dwell between. In one position of dwell, the elevator is maintained stationary by the segment 187 co-operating with plate 186c to prevent rotation of gear 188a. This position is the upper position of the elevator. In its stationary lower position the gear 188a is prevented from rotation by a pawl 190a dropping into a slot 191 in the face of the gear.

The elevator on the other side will be actuated in similar manner by gear 186 meshing with gear 188a.

When the bars have been lifted to the level of the drier floor 172 they are moved from the elevator to the drier floor by means of arms 192 having rollers 192a in their ends, which arms are mounted on upright shafts 192b. The latter are provided with gear segments 192c at their lower ends adapted to mesh with a double rack 193 formed on the end of a pitman connected with the lower end of a lever 193a. There are two of these levers—one for each side of the double unit, levers 193a are pivoted at their upper ends to suitable frame members and to pitmen 193 at their lower ends intermediate their ends, the levers carry rollers 194 which lie in the groove 194a of a face cam carried on shaft 179. This groove is symmetrical and spreads apart the levers and brings them together simultaneously, so as to operate the arms 192 together.

In order to maintain the gelatin solutions uniform and at a uniform constant temperature means is provided to supply the required amount of heat and to agitate the solutions. The heat is supplied by means of jackets 164a and agitation is accomplished through pumps 164b which draw solution from one part of tanks 164 and discharge into another part. These pumps 164b are operated through pulleys 164c and belts from a motor 164d mounted at a convenient place upon the front end of the machine.

*Drier*

Figure 1A:
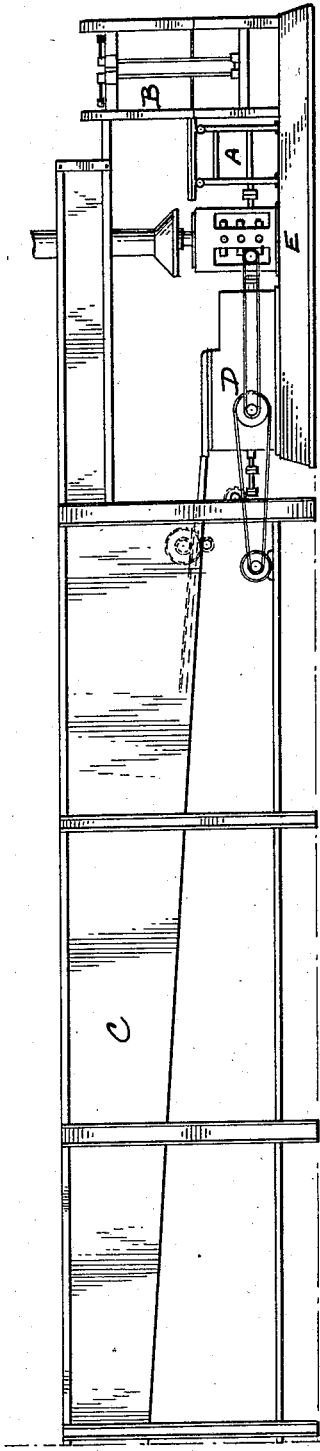
Figure 1B:
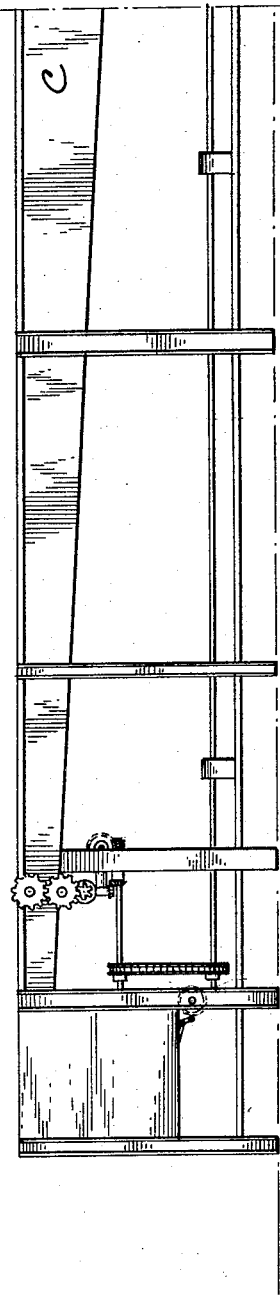

As shown best in Figs 1A and 1B, the drier consists of a long chamber or tunnel through which the groups of bars are conveyed and through which a constant current of air at the proper temperature is forced. This dries the capsule parts thoroughly and places them in condition to be put through the finishing operation of trimming and joining.

The drier tunnel has in it two long inclined floors, the upper one extending the full length of the tunnel and the lower one extending from the back end to the finishing units. These two floors are smooth metal surfaces of a sufficient width to acommodate a number of bars, in the present form of the machine the number accommodated being twenty. The bars are slid lengthwise through the tunnel on the floors by means of long racks which have a cross member at the extreme end which in moving forward pulls an entire line of groups of bars the length of a bar in each step.

In Fig. 17 there is shown at 172 the upper floor of the drier with a group of bars thereon. In Fig. 18 is shown the cross member 250 of the rack having side members 251.

Figure 24:
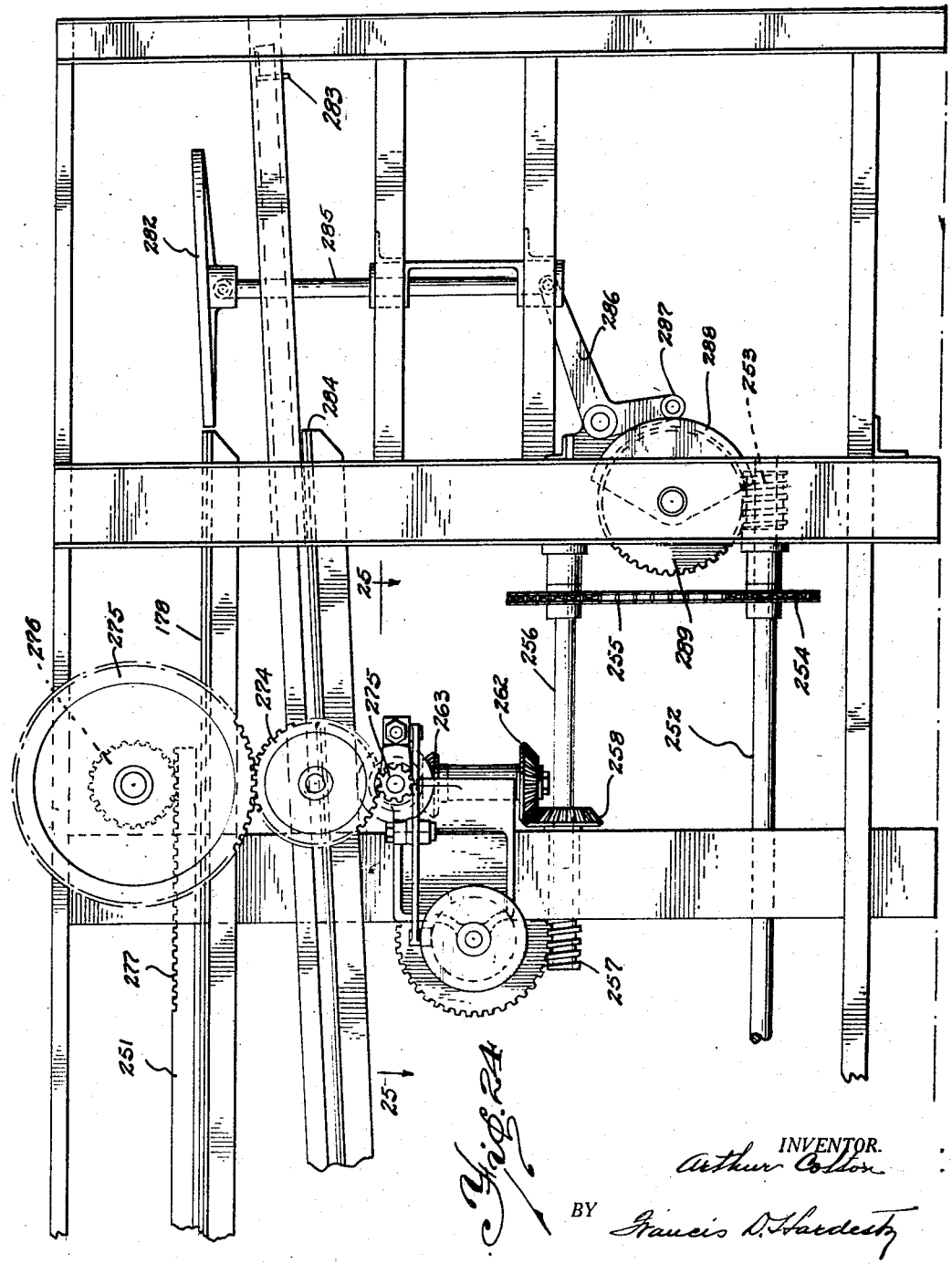
Fig. 24 is a side elevation of the same.
Figure 25:
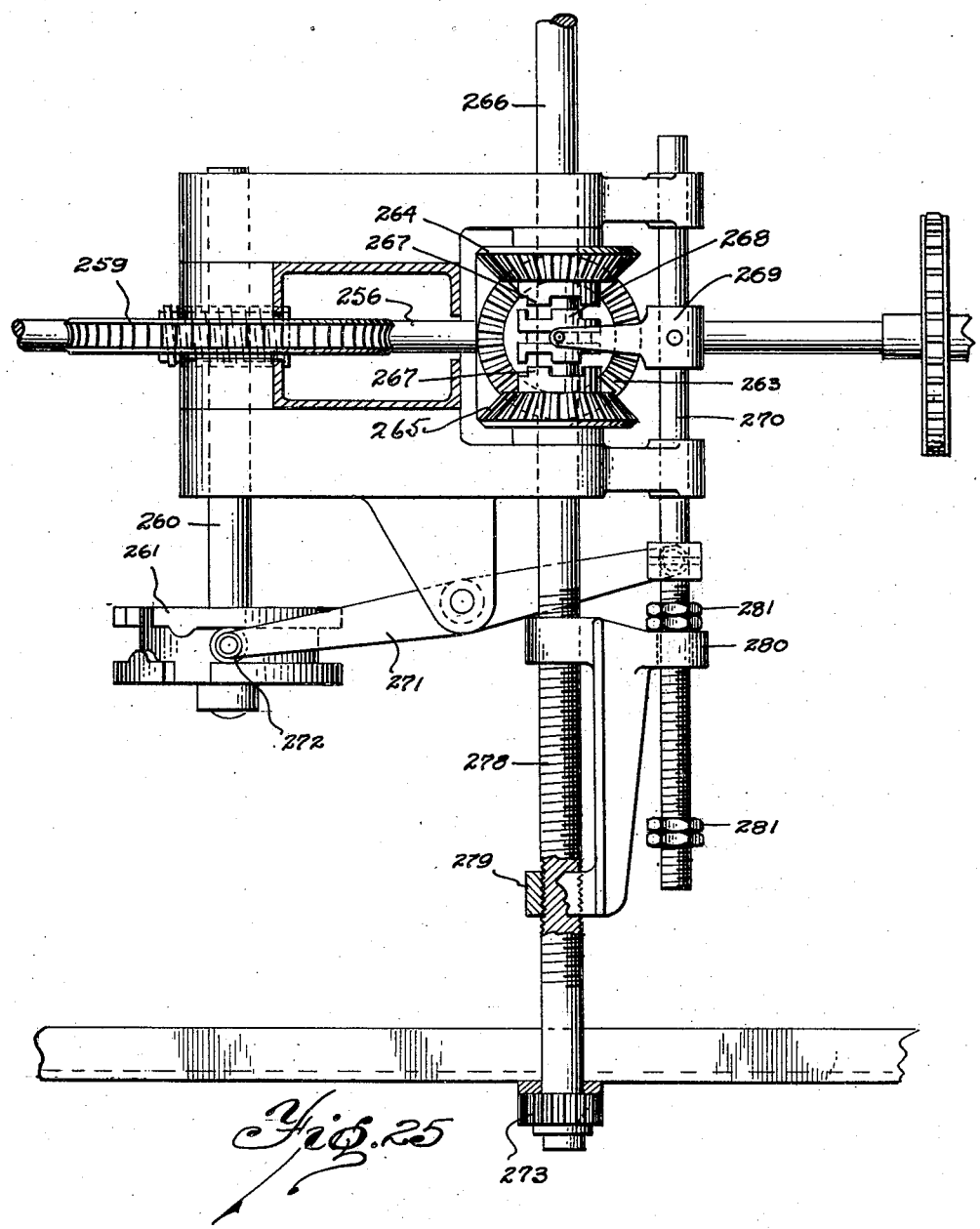
Fig. 25 is an enlarged plan view of the mechanism for operating the slides in the drier.

Figs. 24 and 25 show one view of the operating mechanism for the rack 251 and also show the rear ends of the two floors of the drier together with the means for transferring the bars from the upper floor to the lower floor. In these figures the main drive shaft is shown at 252 and has thereon a worm 253 and sprocket wheel 254. Through a chain 255 the sprocket wheel 254 drives a second shaft 256. This shaft 256 carries a worm 257 and bevel gear 258. Through the worm 257 there is driven a worm wheel 259 on a shaft 260 carrying a cam 261, the purpose of which will be described later.

The bevel gear 258 meshes with the gear 262 on a vertical shaft carrying at its upper end a second bevel gear 263. The latter meshes with two opposed bevels 264 and 265 loosely mounted on a shaft 266 with clutch jaws 267 on their opposed faces. Mounted between the gears 264 and 265 is the mating clutch member 268 splined on the shaft 266. This clutch member is operated by the yoke 269 carried on a sliding shaft 270 which is operated by a lever 271 having a roller 272 operating in the groove of cam 261.

The shaft 266 carries at its end small gears 273 which mesh with larger gears 274 which in turn mesh with gears 275 carrying on their faces gears 276 which mesh with the rack 277 formed on the ends of the side members 251. As the clutch member 268 is moved to one side or the other to engage either gear 264 or gear 265, it will cause the rotation of shaft 266 in whichever direction corresponds to the gear which is thrown into engagement with the clutch. The shaft 266 has a threaded portion 278 upon which is threaded a member 279 which moves longitudinally of the shaft 266 when the latter is rotated, the direction of movement depending upon the direction of rotation of the shaft. This threaded member has at one side an eye 280 which slides loosely over one end of the shaft 270 and the latter is provided with stops 281 in the form of nuts. The stops 281 and the cam 261 together with the lever 271 co-operate to move the clutch member 268 to neutral position at the proper time, and the cam 261 with lever 271 operate to throw the clutch into engagement with the proper gear.

The movement of rack 251 is so arranged that it will move the entire line-up of bars on the floor 178 the length of one bar; and after the entire floor has been filled with bars a further movement moves a group of the bars onto the platform 282 of an elevator which lowers them to the level of the lower drier floor, whereupon a second rack 283 moves this group forward to the rear end of the lower floor 284 of the drier.

The elevator 282 caries upon it a shaft 285, the bottom of which rests upon one arm of a bell crank 286. The other arm of the bell crank carries a roller 287 co-operating with the cam 288 carried on one face of the worm gear 289 co-operating with worm 253 on shaft 252. This cam 288 is so formed as to raise and lower the table 282 and permit it to remain at its two stations long enough to permit the group of bars to be pushed on it at the top and to be pulled off of it at the bottom.

Rack 283 is operated by mechanism located at the forward end of the lower floor and in a manner exactly similar to the operation of the rack 251.

Bar separating and feeding unit

When through the operation of the slide 283, the groups of bars are fed forward on the lower floor 284 of the drier and the latter is completely filled with the groups of bars, the group at the extreme forward end is pushed from the lower end of this floor upon a platform 300 located to one side of the separating mechanism. This platform 300 is normally a little below the lower end of the floor 284 and is lifted at the proper time to receive the group of bars pushed forward by the slide 283. When the platform 300 has received the bars, it is lowered so that the ends of the bars come in contact with the upper side of two sprocket chains carried on the sprockets 301 and 302. The bars in contact with these chains are constantly pressed toward the center of the machine due to the friction of the chains thereon but are prevented from moving due to the fact that the innermost bar abuts against the side 303 of an elevating guide member 304. This member 304 moves downwardly periodically so that a single bar may be moved upon its upper surface from each side. The bar remains upright when the elevator member 304 lifts until it reaches the upper end of its movement, when the rear ends of levers 305 engage the heads of bolts 306 and cause the forward ends to lift and turn the bars upon their sides. When the bars have been turned upon their sides with the pins pointing outwardly, they are in position to be moved into the next unit by mechanism to be described.

Figure 26:
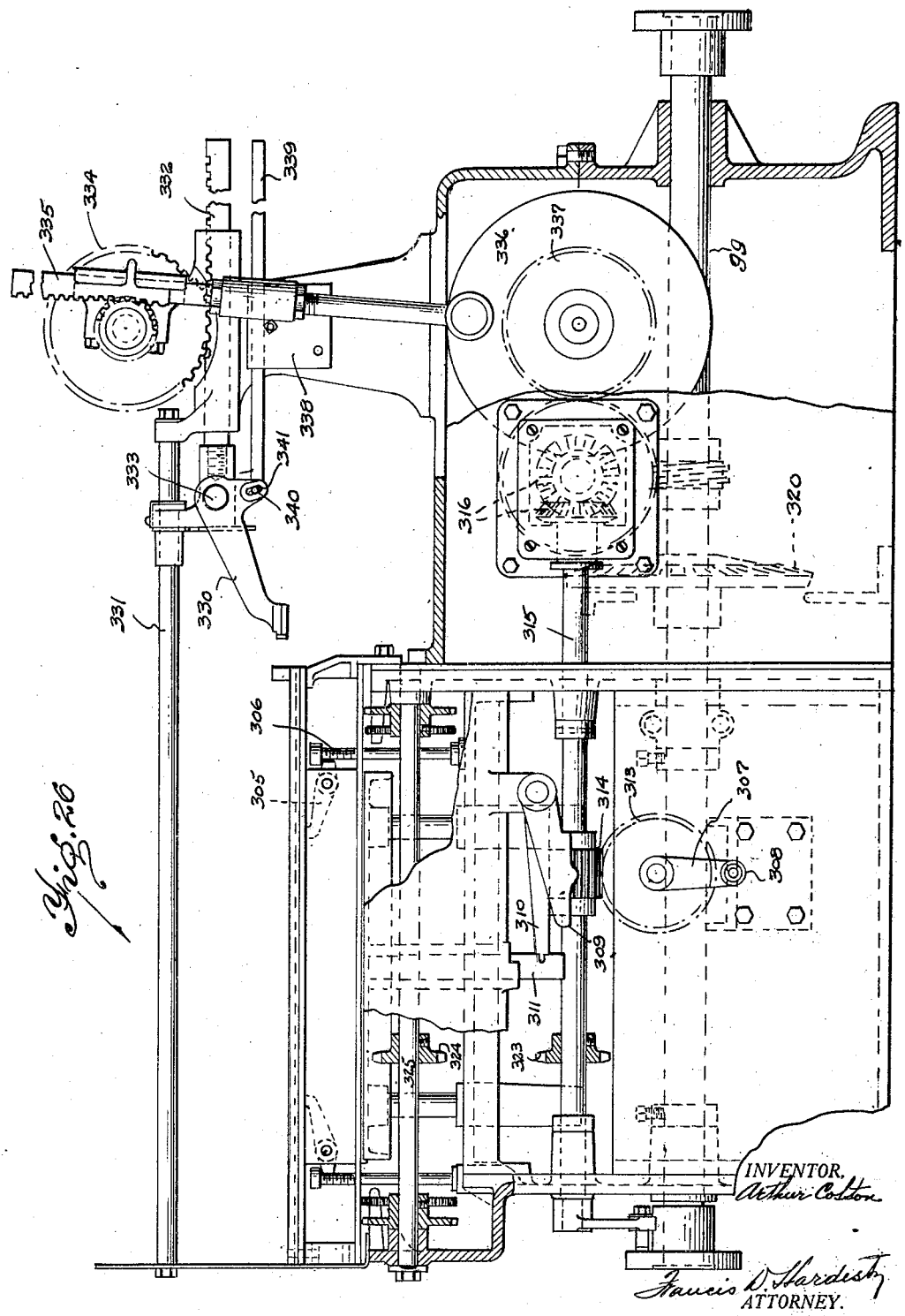
Fig. 26 is a longitudinal section of the bar singling and feeding mechanism.
Figure 27:
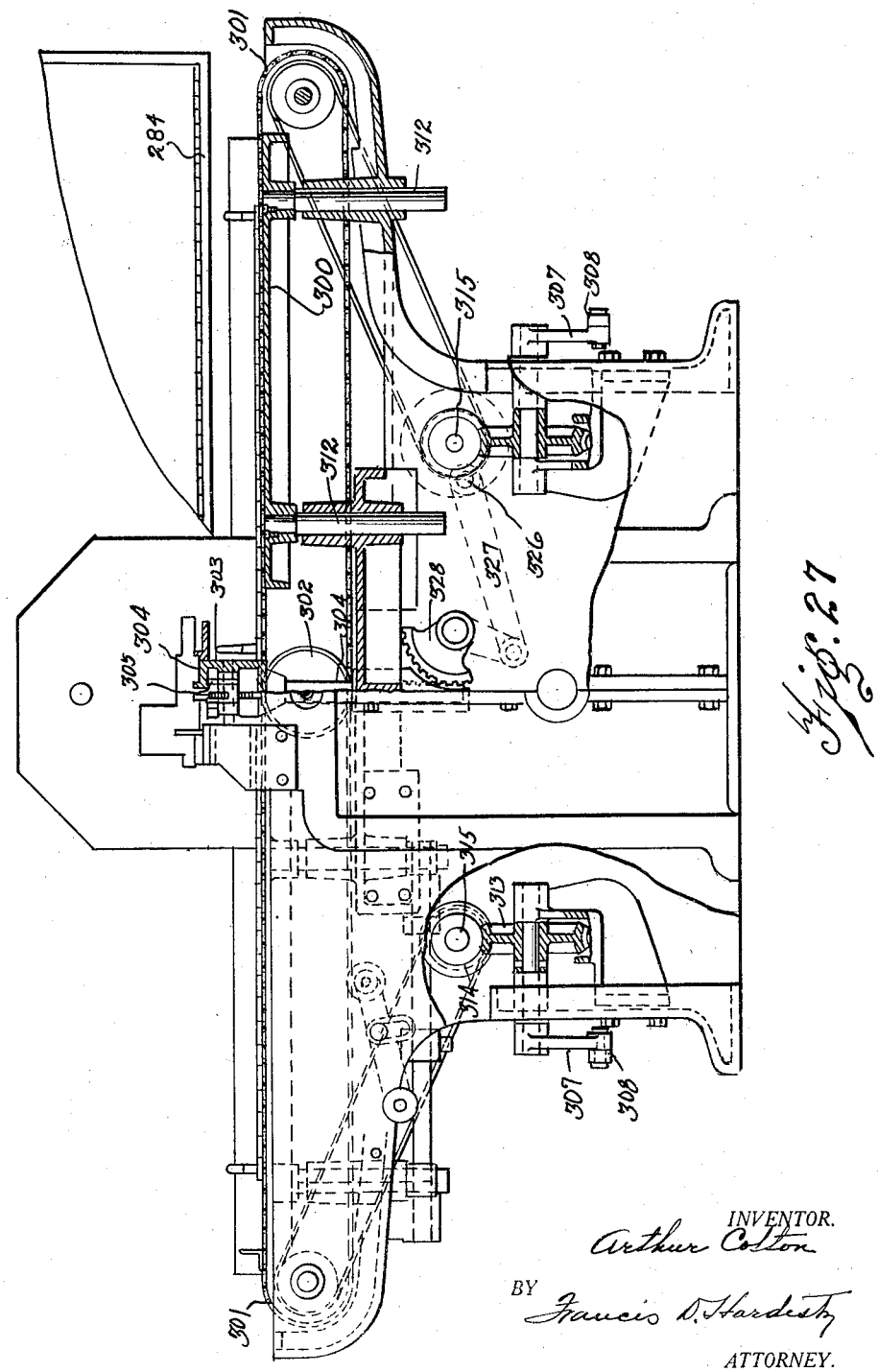
Fig. 27 is an end elevation of this unit from the left of Fig. 26.

As shown best in Fig. 26, the platform 300 is elevated and lowered through the operation of arms 307 carrying rollers 308 which during a revolution contact with the lower surfaces of levers 309 and move these upwardly. The levers 309 are connected integrally with levers 310 which in turn act on the upright members 311 connected with the platform 300. The platform is provided with guides 312.

Figure 28:
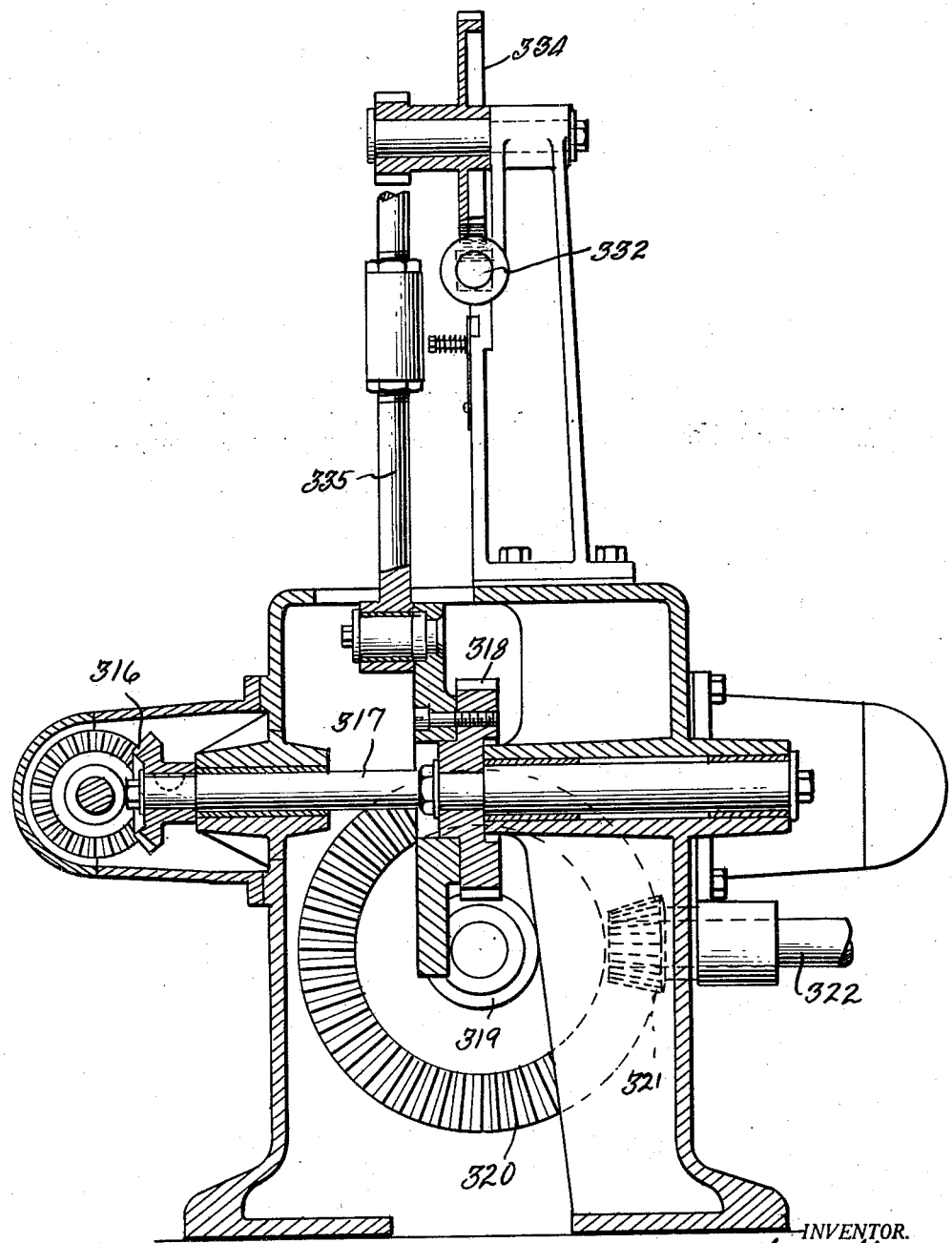
Fig. 28 is a sectional view of the drive unit.

The arm 307 is keyed on a shaft carrying a worm gear 313 operated by a worm 314 keyed to shaft 315 which is driven through bevel gears 316 driven from a cross shaft 317. The shaft 317 is driven by a worm gear 318 and worm 319 which latter worm is on the main power shaft 99. The gearing just mentioned is preferably located adjacent the driving motor for the whole machine, and Figs. 26 and 28 show a large bevel gear 320 driven by a small bevel 321 secured to shaft 322 which is an extension of the shaft from the motor supplying the power.

Each of the shafts 315 carries a sprocket 323 which through a suitable chain drives the shafts carrying the sprockets 301 which drive the chains forward and the bars toward the center line of the machine and the member 304.

The shaft 315 also carries at its free end a crank pin 326 which through link 327 actuates a gear segment 328 co-acting with a rack on the elevator member 304 to raise and lower the latter. When the member 304 has lifted the pair of bars to its upper level, the bars are pushed lengthwise into the next unit of the machine by means of a member 330 which is double so as to contact with both of the bars, and this member is guided in its movement on a longitudinal rod 331 located above the elevator member 304. The member 330 is moved to the left (see Fig. 26) by means of a rack 332 to the end of which the member 330 is pivoted as at 333. This rack is actuated by a gear 334 rotated by a second rack 335 formed on a pitman which is connected at its lower end to a disc 336 carrying a gear 337 meshing with gear 318, mentioned above. Immediately below the rack 332 and its guide is a second guide 338 in which operates a rod 339 the forward end of which is connected to a lug on the member 330 by means of a pin 340 acting in a suitable slot 341 in the lug. During the movement of the member 330 to the left, as in Fig. 26, the friction of the bar 339 in its guide will act as a drag on the member 330 and cause the forward end of said member to stay in its lower position against the ends of the bars being moved. In the rearward movement of the rack 332, the friction of the bar 339 in its guide will cause the member 330 to lift and clear the matrix bars on its return trip.

By means of this mechanism the several groups of matrix bars coming from the drier will be broken up into their individual units and these individual units moved forward into the next unit of the complete machine, which unit is the mechanism for removing the capsules from the pins and putting them through the finishing steps.

Automatic unit

This unit is shown in Figs 29 to 37 inclusive.

The guides carrying the bars which are pushed from the previous unit are shown at 400 at the top of a pedestal 401 which is located at the center line of the machine. There will be one of these units on either side of the pedestal and one of them is shown in end elvation in Fig. 29.

The unit consists of a suitable framework carrying at its outer end a vertical shaft 402 carrying six cams. This cam shaft is driven by a worm gear 403 and worm 404 which worm is driven by the same motor that supplied power for the operation of the rest of the machine. The six cams are numbered 405 to 410 inclusive, with number 405 at the bottom just above the worm gear 403. The cam 405 has its co-operating follower 411 as shown in plan in Fig. 33. The follower 411 is carried by a guide rod 412 which extends nearly to the center of the machine and is formed at its inner end into a rack 413. An intermediate portion of this guide member carries a rack 414. These two racks actuate two gear segments 415 which are keyed upon shafts 416. The shafts 416 carry at their ends two other gear segments 417 co-operating with the vertically arranged racks 418 supporting the trimming and capping mechanism shown in Fig. 34.

Located on the shaft 402 above cam 405 is a double cam 406 and 407. The cam 406 is located on the under side of this cam member while the cam 407 is a face cam with the cam groove in the upper side.

The cam 406 is shown in dotted lines in Fig. 32 and actuates a follower 419 carried on a lever 420 pivoted at 421. The free end of this lever pushes against a rod 422 operating a finger 423 carried by a shaft 424 (shown in Fig. 31) which has keyed to it gear segments 425 adapted to raise and lower racks 426 which carry at their upper ends a stripper release 427.

Cam 407 actuates a roller 428 carried upon a member 429 which acts as a guide and has on its inner end a double rack 430 actuating gears 431. These gears 431 are keyed to shafts 431a which carry gears 431b actuating the gears 431c keyed to shafts 432 and the latter carry at their upper ends small gears 433 which actuate racks 434 secured to a frame 435 carrying the capsule holders 436, to be described more in detail later.

Cam 408 (see Fig. 31) is a face cam with the groove in the upper side, in which is a follower 437 carried by a guide member 438 similar to member 429. The double rack 439 carried by the inner end of member 438 actuates two small gears 440 secured to larger gears 441 which mesh with small gears 442. Gears 442 are keyed to sleeves 443 which surround shafts 432 and which carry at their upper ends small gears 444. The gears 444 mesh with racks 445 which are secured to a frame 446 which carries ejector rods 447 for the capsules.

Cam 409 is also a face cam with the groove in the upper side end in the groove is a follower 448 carired by a gear segment 449 which meshes with a second segment 450 and also with a rack 451. The segment 450 also meshes with a rack 452 which is similar to the rack 451. These racks 451 and 452 carry the stripper fingers, to be described later.

Cam 410 is a cylinder cam carried on the upper end of shaft 402 and actuates a follower 453 carried on a bar 454 which operates the frame carrying the trimming knives. The bar 454 is mounted on the mechanism which is raised and lowered by racks 418 and the cam 410 is correspondingly lengthened vertically in order to take care of the raising and lowering of the follower 453.

The elements acting directly on the capsule parts are shown best in Figs. 34 to 37.

With a bar 98 in place in the automatic unit in guide 400, the stripper frame carried on racks 451 and 452 and carrying the stripper fingers 456 shown in Fig. 36, is moved forward, the release block 427 being in lifted position. When block 427 is lifted the cams 427a cause the ends 456a of the fingers 456 to be pressed toward each other and to thereby open the upper ends, the fingers being hinged at 456b. Upon lowering the block 427 the fingers engage the pins through being pressed apart by springs 456c.

When the stripper fingers are moved forward as described, the frame 435, carrying holders 436 is also moved forward each holder aligned with and close to the end of a pin and the capsule part thereon. As soon as the holder and stripper are in this position, the block 427 moves down and allows the stripper to engage the pin back of the capsule part. The stripper then moves back toward the holder and, in so doing, carries the capsule part off of the pin and into the holder. Whereupon frame 435, holders 436, and strippers 456 move back together and block 427 rises and opens the strippers. At the same time the racks 418 are actuated to lift frames 435 and 446 with their co-operating parts. During the vertical movement of these parts, the holders are rotated rapidly by means of small gears 460 on each holder which mesh with teeth on the underside of a rack 461 which is also provided with teeth on its upper side which mesh with gear 462 on the end of a shaft splined in sleeve 463 carrying gear 464. The latter meshes with a stationary vertical rack 465.

During the upward movement and while the holders are rotating, cam 410 has allowed bar 454 to be moved by spring 466 to slide laterally the frame 467 carrying knives 468 into contact with the portions of the capsule parts projecting from the holders 436 to thereby cut off the excess gelatine.

When the holders 456 and other parts have reached their upper position the cam 410 pulls back the knives and the mechanism moves forward again to a position wherein the ends of the holders 436 are close to the capping guides 470, whereupon the ejector rods 447 are moved forward to eject the capsule parts into the guides. At the same time similar steps are being carried out by the other side of the automatic unit and in the guide 470 the two parts of the capsule meet and the cap is placed on the body of the capsule. When this has taken place the ejector rods on one side are given small additional movement to eject the complete capsules from the guide 470 whereupon they fall upon a conveyor—which moves alongside thereof.

It will of course be understood that these several movements will be timed by the cams 405 to 410 so that while the holders are in their elevated position the bar 98 is moved into the next unit and a new bar moved into its place, the next unit being the greasing unit.

Having now described the preferred form of embodiment of the invention it is to be noted that various changes in form and dimension may be made without departing from the spirit of the invention and the scope of the hereunto appended claims.

While I have described the capsule molds of my machine as pins projecting from bars, it is obvious that this structure forms essentially a multiple mold unit as defined in certain of the claims.

I claim:—

1. A capsule machine comprising mechanism for making capsule bodies, and opposed mechanism for making caps driven synchronously therewith and means for placing the caps upon the bodies.

2. An automatic capsule machine comprising mechanism for making capsule bodies, and opposed mechanism for making caps driven synchronously therewith, one of said mechanisms being adapted to make its product of a different material than the other and means for placing the caps upon the bodies.

3. An automatic capsule part making machine comprising a pin upon which said part is to be formed, means for greasing said pin, means for coating said pin with fluid capsule-making material, means for initially setting said material, drying means for said material, means for removing said part from said pin and finishing and means for returning said pin to said greasing means, all of said means being mounted in a series synchronously driven.

4. An automatic capsule part making machine comprising a bar carrying a plurality of pins upon which the capsule parts are to be formed, means for simultaneously greasing the pins, means for coating said pins with fluid capsule-making material, means for initially setting said material, means for drying said material, means for simultaneously removing said parts so formed from said pins and finishing and means for returning said bar and pins to said greasing means, all of said means being mounted in a series synchronously driven.

5. An automatic capsule part making machine comprising a plurality of bars each carrying a plurality of pins upon which the capsule parts are to be formed, means for greasing the pins on consecutive bars, means for grouping the bars, means for coating the pins of a group of bars, with fluid capsule-making material, means for initially setting said material, means for drying said material while maintaining the groups, means for removing said capsule parts from the pins and finishing and means for returning said bar and pins to said greasing means, all of said means being mounted in a series synchronously driven.

6. An automatic capsule part making machine comprising a plurality of bars each carrying a plurality of pins upon which the capsule parts are to be formed, means for greasing the pins on consecutive bars, means for grouping the bars, means for coating the pins of a group of bars while grouped, with fluid capsule-making material, means for initially setting said material, means for drying said material while maintaining the groups, means for separating said groups into single bars, means for removing the capsule parts from the pins on each bar and finishing and means for returning said bars and pins to said greasing means, all of said means being mounted in a series synchronously driven.

7. An automatic capsule part making machine comprising a plurality of bars each carrying a plurality of pins upon which the capsule parts are to be formed, means for greasing the pins on consecutive bars, means for grouping the bars, means for coating the pins of a group of bars while grouped, with fluid capsule-making material, means for initially setting said material, means for collecting together a plurality of said groups, a dryer, means for conveying said collections of groups through said dryer, means for separating said collections into single bars, means for removing the capsule parts from the pins on each single bar and finishing and means for returning said bars and pins to said greasing means, all of said means being mounted in a series synchronously driven.

8. In an automatic capsule machine in which the capsule parts are formed upon pins carried by bars, a greasing unit, a dipping unit, a drying unit, and a stripping and finishing unit, means for feeding the bars singly into said greasing unit from the stripping and finishing unit, and for feeding said bars into said dipping unit from said greasing unit, means for grouping said bars into small groups, means for dipping the pins on said bars while grouped, means for transferring said groups from said dipping unit to said drying unit and forming said small groups into larger groups, means for moving said larger groups of bars through the drying unit, and means for feeding single bars from said larger groups into and through said stripping and finishing unit to said greasing unit the latter feeding means being the same as the first mentioned feeding means and all of said units and means being synchronously driven.

9. In capsule-making devices, a pair of similar machines for making capsule bodies and caps respectively, located in parallel position upon common frame members and in opposed relation, a single driving mechanism for both machines, and a single feeding mechanism, whereby said machines are operated synchronously.

10. In capsule making devices, in which the capsule parts are formed on pins carried by a plurality of separate bars, a pair of similar machines for making capsule bodies and caps respectively, located in parallel position upon common frame members and in opposed relation, a single driving mechanism for both machines, a double guide for pin bars located between said machines and lengthwise thereof, and a single feeding device for moving the pin bars successively along said guide.

11. In capsule making devices, in which the capsule parts are formed on pins carried by a plurality of separate bars, a pair of similar machines for making capsule bodies and caps respectively, located in parallel position upon common frame members and in opposed relation, a single driving mechanism for both machines, a double guide for pin bars located longitudinally between said machines and arranged to hold pairs of said bars with the pins pointing outwardly and a device for moving the bars successively along said guide.

12. In capsule making devices, in which the capsule parts are formed on pins carried by a plurality of separate bars, a dryer from which said bars are delivered in groups, a unit in which said groups are broken up into single bars, a unit in which the parts are stripped from the pins, a unit for greasing said pins, a unit for dipping said pins, each of said units having a length equal to the length of a bar, a bar guiding and holding means traversing said singling, stripping and greasing units, and means for moving intermittently a succession of bars in said guiding means a distance equal to the length of a bar.

13. In a capsule making device in which capsule parts are formed on a plurality of pins in alignment and carried by a bar, means for greasing all of said pins simultaneously comprising a frame, a guide for the pin bar mounted on said frame, a carriage movable on said frame toward and away from said guide, the latter being arranged to hold the bar with the pins pointing toward said carriage, spindles equal in number to the said pins mounted rotatably on said carriage, greasing cups on said spindles means for rotating the spindles and means for moving said carriage to bring said cups over said pins, and to move said carriage and cups away from said pins.

14. In a capsule making device in which capsule parts are formed on a plurality of pins in alignment and carried by a bar, means for greasing all of said pins simultaneously comprising a frame, a guide for the pin bar mounted on said frame, a carriage movable on said frame toward and away from said guide, the latter being arranged to hold the bar with the pins pointing toward said carriage, spindles equal in number to the said pins mounted rotatably on said carriage, greasing cups on said spindles means for rotating the spindles, means for moving said carriage to bring said cups over said pins, and to move said carriage and cups away from said pins, and means to remove said bar from said guide and to insert another.

15. In a capsule making device in which capsule parts are formed on a plurality of pins in alignment carried by a bar a double guide for positioning a pair of such bars with the pins horizontal and pointing outward, a frame supporting said guide and having mounted thereon a carriage on each side of said guide and movable toward and away from said guide means for moving said carriages rotatable spindles on said carriages equal in number to the pins on said bars, each spindle being provided with a greasing cup adapted to slide over a pin when its carriage is moved toward the guide, intermeshing gears on said spindles, a drive gear meshing with one of said spindle gears mounted on each carriage, a shaft splined in said last mentioned gears and means for rotating said shaft.

16. In a capsule making device in which capsule parts are formed on a plurality of pins in alignment carried by a bar a double guide for positioning a pair of such bars with the pins horizontal and pointing outward, a frame supporting said guide and having mounted thereon a carriage on each side of said guide and movable toward and away from said guide means for moving said carriages, rotatable spindles on said carriages equal in number to the pins on said bars, each spindle being provided with a greasing cup adapted to slide over a pin when its carriage is moved toward the guide, intermeshing gears on said spindles, a drive gear meshing with one of said spindle gears mounted on each carriage, a shaft splined in said last mentioned gears and means for removing said bars from said guide and inserting others during the time when said carriages have been moved away from said guide and the bars therein.

17. In capsule making devices, in which the capsule parts are formed on pins carried by bars, a greasing unit through which said bars are moved longitudinally a receiver for bars coming out of said greasing unit, said receiver adapted to support said bars with the pins hanging down a dipping device, means in said receiver for moving said bars laterally into groups and for moving said groups laterally into and out of said dipping device, a tank adapted to contain capsule-making material in fluid form located beneath said dipping device, and means for actuating said dipping device successively to dip the pins on said groups of bars into said material.

18. In capsule making devices, in which the capsule parts are formed on pins carried by bars, a greasing unit through which said bars are moved longitudinally a receiver for bars coming out of said greasing unit, said receiver adapted to support said bars with the pins hanging down a dipping device, means in said receiver for moving said bars laterally into and out of said dipping device, a tank adapted to contain capsule-making material in fluid form located beneath said dipping device, and means for actuating said dipping device successively to dip the pins on said bars into said material.

19. In capsule making devices, in which the capsule parts are formed on pins carried by bars, a greasing unit through which said bars are moved longitudinally a receiver for bars coming out of said greasing unit, said receiver adapted to support said bars with the pins hanging down a dipping device means in said receiver for moving said bars laterally into groups and for moving said groups laterally into and out of said dipping device, a tank adapted to contain capsule-making material in fluid form located beneath said dipping device, and means for actuating said dipping device successively to dip the pins on said groups of bars into said material, a dryer having its receiving end located over said receiver and dipping device, and means for elevating said bars, after being dipped, to said dryer and at the same time subjecting the coated pins to passing air to produce initial setting of the material.

20. In capsule making devices, in which the capsule parts are formed on pins carried by bars, a greasing unit through which said bars are moved longitudinally a receiver for bars coming out of said greasing unit, said receiver adapted to support said bars with the pins hanging down, a dipping device, means in said receiver for moving said bars laterally into groups and for moving said groups laterally into and out of said dipping device, a tank adapted to contain capsule-making material in fluid form located beneath said dipping device, and means for actuating said dipping device successively to dip the pins on said groups of bars into said material, a dryer having its receiving end located over said receiver and dipping device, and means for elevating said bars, after being dipped, to said dryer, said elevating means comprising means to rotate said bars about a longitudinal axis.

21. In a capsule making device in which the capsule parts are formed on pins carried by bars, each carrying a plurality of pins, a greasing unit for said pins, a receiver for bars coming from said unit, a container for fluid capsule-making material, a dipping device for dipping the said pins on said bars into said material, means for moving said bars laterally into said dipping device, a drier located at a level higher than said receiver and dipping device, elevating means adapted to receive the bars from the device and to lift them to the level of said drier, and means to move the bars laterally out of said elevating means onto the floor of said drier.

22. In a capsule making device in which the capsule parts are formed on pins carried by bars, each carrying a plurality of pins, a greasing unit for said pins, a receiver for bars coming from said unit, a container for fluid capsule-making material, a dipping device for dipping the said pins on said bars into said material, means for moving said bars laterally into said dipping device, a drier located at a level higher than said receiver and dipping device, elevating means adapted to receive the bars from the device and to lift them to the level of said drier, and means to move the bars laterally out of said elevating means onto the floor of said drier, and means for moving said bars through said drier.

23. In a capsule making device, in which the capsule parts are formed on pins, a container for fluid capsule making material, means for maintaining the temperature of said material in said container at a constant temperature somewhat above that of the surrounding atmosphere, means for dipping said pins in said material to thereby coat the pins, and means for whirling said pins through the air to facilitate initial setting of the material.

24. In a capsule making device, in which the capsule parts are formed on pins, a container for fluid capsule making material, means for maintaining the temperature of said material in said container at a constant temperature somewhat above that of the surrounding atmosphere, means for dipping said pins in said material to thereby coat the pins, a drying device for said coating, and means to convey the pins from the dipping means to said drying device and at the same time move them rapidly through the surrounding air in a path longer than the distance between the dipping means and drying device.

25. In a capsule making device in which the capsule parts are formed upon pins carried by a plurality of bars, means for greasing said pins, means for coating said pins with capsule-making material, means for drying said coatings on said pins, said drying means comprising an extended drying chamber and means for moving the bars through said chamber while passing air therethrough.

26. In a capsule making device in which the capsule parts are formed upon pins carried by a plurality of bars, means for greasing said pins, means for coating said pins with capsule-making material, means for conveying said bars carrying the coated pins to a drying device, means for grouping a plurality of said bars, means for moving intermittently the groups of bars into said drying device each movement being equal to the length of a bar, a table for receiving a group of bars as it comes from the drying device, and means for removing the bars from the table and feeding them singly to a finishing unit.

27. In capsule making devices in which the capsule parts are formed on pins carried by a plurality of bars, means for coating the pins with capsule material, means for moving for the coated pins longitudinally through a dryer in groups, a table for receiving a group of bars coming out of said dryer, means for moving the bars on said table toward one side thereof, and means at said side of said table for moving the bars singly from said table and into a stripping and finishing unit.

28. In capsule making devices in which the capsule parts are formed on pins carried by a plurality of bars, means for coating the pins with capsule material, means for moving said bars with the coated pins longitudinally through a dryer in groups, a table normally at a lower level than the end of said dryer, means for elevating said table to the level of said dryer to receive a group of bars therefrom and to lower said table to its normal level, means adapted to act on said bars at said lower level to move them laterally on said table, and a reciprocating member toward which said bars are moved, said member adapted to move said bars singly into the succeeding unit of the device.

29. In capsule making devices in which the capsule parts are formed on pins carried by a plurality of bars, means for coating the pins with capsule material, means for moving said bars with the coated pins longitudinally through a dryer in groups, a table normally at a lower lever than the end of said dryer, means for elevating said table to the level of said dryer to receive a group of bars therefrom and to lower said table to its normal level, means adapted to act on said bars at said lower level to move them laterally on said table, and a reciprocating member toward which said bars are moved, said member adapted to push successively single bars from said group into a succeeding unit of the device and means co-operating with said reciprocating member to turn said bars to place the pins in a horizontal position prior to being moved by said member.

30. In a capsule making device provided with a plurality of separate bars each carrying a plurality of pins, means for coating said pins with capsule making material in fluid form and means for initially drying said coatings means for substantially completely drying said coatings, which means comprises an upper chamber and a lower chamber, means operating intermittently to feed said bars laterally upon the floor of said upper chamber and form groups thereof having a predetermined number of bars therein, reciprocating means to move said groups successively into and longitudinally of the upper chamber a distance equal to the length of a bar, means at the opposite end of said upper chamber to receive successively the groups as moved out of the chamber and lower them to the level of the lower chamber and means in lower chamber to move said groups successively into and longitudinally of said lower chamber.

31. In a capsule making device provided with a plurality of separate bars each carrying a plurality of pins, means for coating said pins with capsule making material in fluid form and means for initially drying said coating means for substantially completely drying said coatings, which means comprises an upper chamber and a lower chamber, means operating intermittently to feed said bars laterally upon the floor of said upper chamber and form groups thereof having a predetermined number of bars therein, reciprocating means to move said groups successively into and longitudinally of the upper chamber a distance equal to the length of a bar, means at the opposite end of said upper chamber to receive successively the groups as moved out of the chamber and lower them to the level of the lower chamber and means in lower chamber to move said groups successively into and longitudinally of said lower chamber, said moving means in said chambers each consisting of a pair of longitudinally arranged rack members provided with a cross member adapted to act against the rear ends of the bars of a group and means to reciprocate said rack members.

32. In a capsule making device, in which the capsule parts is formed on a pin, means for removing said part from said pin and finishing, said means comprising a cup-shaped holder adapted to fit over a capsule part, a stripper adapted to strip said part from said pin and press it into said holder, a trimming knife movable into position to cut off the portion of the capsule extending from the holder, means for rotating said holder with said extending capsule portion against knife, and means to eject the capsule part from said holder.

33. In a capsule making device in which the capsule parts are formed on a plurality of pins carried by a bar, a stripping and finishing unit comprising means for holding said bar with the pins in horizontal position, a plurality of cup-shaped holders in alignment with the pins when said bar is in said holding means, a stripper for each of said pins, means for moving said holders into proximity with said pins, means for actuating said strippers to remove the capsule parts from said pins and insert them into said holders, means for cutting off the portions of said capsule parts that extend from said holders, and means for ejecting said parts from said holders.

34. In a capsule making device in which the capsule parts are formed on a plurality of pins carried by each of a plurality of bars, a stripping and finishing unit, means for feeding said bars successively into said unit, means for holding each bar while in said unit with the pins in horizontal position, a stripper for each pin movable into operating position after a bar has been moved into position, a cup-shaped holder for each capsule part adapted to move into proximity with and in axial alignment with each pin, means for actuating said strippers to remove the capsule parts from the pins and insert them into the holders, means for trimming excess material from said capsule parts while in said holders and means for ejecting said parts from said holders.

35. In a capsule making device in which capsule bodies are formed on a plurality of pins carried by each of a plurality of bars and capsule caps are formed on a like number of pins carried by each of a like number of similar bars, a stripping and finishing unit into which pairs of said bars are successively fed, means for holding said pairs of bars with the pins horizontal and pointing outward, a cup-shaped holder for each capsule body, a cup-shaped holder for each capsule cap, means for stripping the bodies and caps each from its pin and inserting them each into its respective holder, means for trimming excess material from said bodies and caps, a capping guide means, and means for ejecting said bodies and caps from the holders into said guide means to thereby place each cap upon a body and means for ejecting the completed capsule from said guide means.

36. In a capsule making device in which capsule bodies are formed on a plurality of pins carried by each of a plurality of bars and capsule caps are formed on a like number of pins carried by each of a like number of similar bars, a stripping and finishing unit into which pairs of said bars are successively fed, means for holding said pairs of bars with the pins horizontal and pointing outward, a cup-shaped holder for each capsule body, a cup-shaped holder for each capsule cap, means for stripping the bodies and caps each from its pin and inserting them each into its respective holder means for trimming excess material from said bodies and caps, a capping guide means, and means for ejecting said bodies and caps from the holders into said guide means to thereby place each cap upon a body and means for ejecting the completed capsule from said guide means upon conveying means adapted to carry the capsules to a suitable receiver.

37. In a capsule making device in which capsule bodies are formed on a plurality of pins carried by each of a plurality of bars and capsule caps are formed on a like number of pins carried by each of a like number of similar bars, a stripping and finishing unit into which pairs of said bars are successively fed, means for holding said pairs of bars with the pins horizontal and pointing outward, a cup-shaped holder for each capsule cap, means for stripping the bodies and caps each from its pin and inserting them each into its respective holder, a capping guide located above said bar holding means, means for lifting said holders to alignment with said guide, means operable during said lifting to trim excess material from the capsule parts, and means for ejecting the parts from the holders into said capping guide to thereby place the caps upon the bodies and means to eject the capsules from said guide.

38. In a capsule making device in which capsule bodies are formed on a plurality of pins carried by each of a plurality of bars and capsule caps are formed on a like number of pins carried by each of a like number of similar bars, a stripping and finishing unit into which pairs of said bars are successively fed, means for holdng said pairs of bars with the pins horizontal and pointing outward, a cup-shaped holder for each capsule body, a cup-shaped holder for each capsule cap, means for stripping the bodies and caps each from its pin and inserting them each into its respective holder, a capping guide located above said bar holding means, means for lifting said holders to alignment with said guide, means operable during said lifting to trim excess material from the capsule parts and means for ejecting the parts from the holders into said capping guide to thereby place the caps upon the bodies and means to eject the capsules from said guide upon a conveyor located below said guide but above said bar holding means.

39. In a capsule making device in which capsule bodies are formed on a plurality of pins carried by each of a plurality of bars and capsule caps are formed on a like number of pins carried by each of a like number of similar bars, a stripping and finishing unit into which pairs of said bars are successively fed, means for holding said pairs of bars with the pins horizontal and pointing outward, a cup-shaped holder for each capsule body, a cup-shaped holder for each capsule cap, means for stripping the bodies and caps each from its pin and inserting them each into its respective holder, means for trimming excess material from said bodies and caps, a capping guide means, and means for ejecting said bodies and caps from the holders into said guide means to thereby place each cap upon a body and means for ejecting the completed capsule from said guide means and means operable during said trimming and ejecting operations to replace the stripped bars of pins with a pair of unstripped bars.

40. In a capsule making device, means for moving simultaneously through said device a pair of bars one bar carrying pins upon which capsule bodies may be formed and the other pins upon which capsule caps may be formed, said device including means for coating the pins with capsule material in fluid form, means for drying the coatings and means for removing from said pins the bodies and caps, trimming off excess material, and placing the caps upon the bodies.

41. The method of manufacturing capsules which consists in passing independent cap and body multiple mold units through successive cycles in separate orbits, coating, drying and stripping the molds at successive points in each orbit and trimming and joining the stripped caps and bodies.

42. The method of manufacturing capsules which consists in passing independent cap and body multiple mold units through successive cycles in separate orbits, grouping the units at points in their respective orbits, coating and drying the grouped molds, separating the units from their groups into cooperating pairs, simultaneously stripping the caps and bodies from the molds of each pair and trimming and joining the same.

43. The method of manufacturing capsules which consists in passing independent cap and body multiple mold units through successive cycles in separate orbits, coating and drying the molds of said units in groups, stripping the caps and bodies from said units in pairs, and trimming and joining said caps and bodies.

44. A machine for forming capsules comprising independent cap and body multiple mold units, means for synchronously advancing said units through successive cycles in separate orbits including coating, drying and stripping means, and means co-operating with the stripping means in both orbits for trimming and joining the corresponding caps and bodies.

45. A machine for forming capsules comprising independent cap and body multiple units, means for synchronously advancing said units through successive cycles in separate orbits including coating, drying and stripping means at successive points, means for grouping the units in each orbit in advance of the coating and drying operations, means for separating the units from the groups in advance of the stripping means, and means co-operating with the stripping means for trimming and joining the corresponding caps and bodies.

46. In a machine for forming capsules, the combination of independent cap and body multiple mold units, means for simultaneously stripping the capsules from each unit and for trimming the same, and means for simultaneously joining the stripped and trimmed caps with the stripped and trimmed bodies.

47. In a machine for forming capsules, the combination with a pair of independent cap and body multiple mold units, of means for simultaneously stripping all of the capsules from each unit and for trimming the same while maintained in the same relation, and means for simultaneously joining the caps from one member of said pair of units with the bodies from the other member of the pair.

48. In a machine for manufacturing capsules, a pair of independent cap and body multiple mold units, means for simultaneously stripping all of the capsules from each unit, holders for the stripped capsules, trimming means cooperating with said holders and means for transporting the holders for the caps into registration with the holders for the bodies, and means for joining the caps with the bodies while in registration.

ARTHUR COLTON.